United States Patent
Soulodre

(10) Patent No.: US 9,264,834 B2
(45) Date of Patent: Feb. 16, 2016

(54) SYSTEM FOR MODIFYING AN ACOUSTIC SPACE WITH AUDIO SOURCE CONTENT

(75) Inventor: Gilbert Arthur Joseph Soulodre, Kanata (CA)

(73) Assignee: Harman International Industries, Incorporated, Northridge, CA (US)

( * ) Notice: Subject to any disclaimer, the term of this patent is extended or adjusted under 35 U.S.C. 154(b) by 768 days.

(21) Appl. No.: 13/544,490

(22) Filed: Jul. 9, 2012

(65) Prior Publication Data

US 2012/0275613 A1 Nov. 1, 2012

Related U.S. Application Data

(63) Continuation of application No. 12/054,388, filed on Mar. 25, 2008, now Pat. No. 8,670,850, which is a continuation-in-part of application No. 11/533,707, filed on Sep. 20, 2006, now Pat. No. 8,036,767.

(51) Int. Cl.
*H04S 5/00* (2006.01)
*G01H 7/00* (2006.01)
(Continued)

(52) U.S. Cl.
CPC *H04S 5/005* (2013.01); *G01H 7/00* (2013.01); *H04S 7/301* (2013.01); *G10L 2021/02082* (2013.01); *H04R 29/00* (2013.01)

(58) Field of Classification Search
CPC ..... H04S 7/301; H04S 2420/01; H04S 5/005; H04R 2227/007; G01H 7/00; G10K 15/08; G10L 2021/02082
USPC .............................. 381/66, 63, 58, 56; 700/94
See application file for complete search history.

(56) References Cited

U.S. PATENT DOCUMENTS

| 4,066,842 A | 1/1978 | Allen | 179/1 P |
| 4,118,599 A | 10/1978 | Iwahara et al. | 179/1 G |

(Continued)

FOREIGN PATENT DOCUMENTS

| CN | 1605186 A | 4/2005 | |
| EP | 0 989 543 A2 | 3/2000 | G10K 15/08 |

(Continued)

OTHER PUBLICATIONS

Wang, David L., Lim, Jae S., The Unimportance of Phase in Speech Enhancement, IEEE Transactions on Acoustics, Speech, and Signal Processing, vol. ASSP-30, No. 4, Aug. 1982, 3 pgs.

(Continued)

*Primary Examiner* — Davetta W Goins
*Assistant Examiner* — Daniel Sellers
(74) *Attorney, Agent, or Firm* — Alleman Hall McCoy Russell & Tuttle LLP

(57) ABSTRACT

An audio signal processing system is configured to separate an audio signal into a dry signal component and one or more reverberant signal components. The dry signal component and the reverberant signal components can be separately modified and then recombined to form a processed audio signal. Alternatively, the dry signal component may be combined with an artificial reverberation component to form the processed audio signal. Modification of the reverberation signal component and generation of the artificial reverberation component may be performed in order to modify the acoustic characteristics of an acoustic space in which the audio signal is driving loudspeakers. The audio signal may be a pre-recorded audio signal or a live audio signal generated inside or outside the acoustic space.

22 Claims, 13 Drawing Sheets

(51) Int. Cl.
*H04S 7/00* (2006.01)
*G10L 21/0208* (2013.01)
*H04R 29/00* (2006.01)

(56) References Cited

U.S. PATENT DOCUMENTS

| | | | |
|---|---|---|---|
| 4,159,397 A | 6/1979 | Iwahara et al. | 179/1 GQ |
| 4,829,574 A | 5/1989 | Dewhurst et al. | 381/41 |
| 4,912,767 A | 3/1990 | Chang | 381/47 |
| 5,068,897 A | 11/1991 | Yamato et al. | 381/24 |
| 5,210,366 A | 5/1993 | Sykes | 84/616 |
| 5,210,802 A | 5/1993 | Aylward | 381/61 |
| 5,285,503 A | 2/1994 | Satoh et al. | 381/109 |
| 5,303,307 A | 4/1994 | Elko et al. | 381/92 |
| 5,305,386 A | 4/1994 | Yamato | 381/1 |
| 5,386,478 A | 1/1995 | Plunkett | 381/103 |
| 5,394,472 A | 2/1995 | Broadie | 381/1 |
| 5,440,639 A | 8/1995 | Suzuki et al. | 381/17 |
| 5,491,754 A | 2/1996 | Jot et al. | 381/63 |
| 5,511,129 A * | 4/1996 | Craven et al. | 381/103 |
| 5,568,558 A | 10/1996 | Ramm et al. | 381/94 |
| 5,579,396 A | 11/1996 | Iida et al. | 381/18 |
| 5,581,618 A | 12/1996 | Satoshi et al. | 381/17 |
| 5,594,800 A | 1/1997 | Gerzon | |
| 5,710,818 A | 1/1998 | Yamato et al. | 381/1 |
| 5,727,066 A | 3/1998 | Elliott et al. | |
| 5,742,689 A | 4/1998 | Tucker et al. | 381/17 |
| 5,754,663 A | 5/1998 | Goldfarb | 381/82 |
| 5,757,927 A | 5/1998 | Gerzon et al. | |
| 5,761,315 A | 6/1998 | Iida et al. | 381/18 |
| 5,768,124 A | 6/1998 | Strothers et al. | |
| 5,822,438 A | 10/1998 | Sekine et al. | 381/17 |
| 5,848,163 A | 12/1998 | Gopalakrishnan et al. | 381/56 |
| 5,862,227 A | 1/1999 | Orduna-Bustamante et al. | |
| 6,052,470 A | 4/2000 | Mouri | 381/18 |
| 6,111,962 A | 8/2000 | Akio | 381/63 |
| 6,122,382 A | 9/2000 | Iida et al. | 381/18 |
| 6,243,322 B1 | 6/2001 | Zakarauskas | 367/127 |
| 6,366,679 B1 | 4/2002 | Steffen et al. | 381/356 |
| 6,385,320 B1 | 5/2002 | Lee | 381/17 |
| 6,522,756 B1 | 2/2003 | Maisano et al. | 381/92 |
| 6,549,630 B1 | 4/2003 | Bobisuthi | 381/94.7 |
| 6,584,203 B2 | 6/2003 | Elko et al. | 381/92 |
| 6,625,587 B1 | 9/2003 | Erten et al. | 706/22 |
| 6,674,865 B1 | 1/2004 | Venkatesh et al. | 381/107 |
| 6,691,073 B1 | 2/2004 | Erten et al. | 702/190 |
| 6,738,479 B1 * | 5/2004 | Sibbald et al. | 381/17 |
| 6,754,623 B2 | 6/2004 | Deligne et al. | 704/233 |
| 6,850,621 B2 | 2/2005 | Sotome et al. | 381/17 |
| 6,937,737 B2 | 8/2005 | Polk, Jr. | 381/300 |
| 6,947,570 B2 | 9/2005 | Maisono | 381/313 |
| 6,956,954 B1 | 10/2005 | Takemura et al. | 381/307 |
| 7,003,119 B1 | 2/2006 | Arthur | 381/17 |
| 7,020,291 B2 | 3/2006 | Buck et al. | 381/92 |
| 7,039,197 B1 | 5/2006 | Venkatesh et al. | 381/86 |
| 7,065,338 B2 | 6/2006 | Mano et al. | |
| 7,065,416 B2 | 6/2006 | Weare et al. | 700/94 |
| 7,076,068 B2 | 7/2006 | Sotome et al. | 381/17 |
| 7,082,201 B2 | 7/2006 | Sotome et al. | 381/17 |
| 7,095,455 B2 | 8/2006 | Jordan et al. | 348/734 |
| 7,095,865 B2 | 8/2006 | Katayama et al. | 381/309 |
| 7,099,480 B2 | 8/2006 | Willems | 381/18 |
| 7,113,609 B1 | 9/2006 | Neidich et al. | 381/305 |
| 7,113,610 B1 | 9/2006 | Chrysanthakopoulos | 381/309 |
| 7,123,731 B2 | 10/2006 | Cohen et al. | 381/303 |
| 7,167,566 B1 | 1/2007 | Bauck | 381/17 |
| 7,171,003 B1 | 1/2007 | Venkatesh et al. | 381/66 |
| 7,177,432 B2 | 2/2007 | Eid et al. | 381/22 |
| 7,206,413 B2 | 4/2007 | Eid et al. | 381/22 |
| 7,231,053 B2 | 6/2007 | Polk, Jr. | 381/300 |
| 7,242,782 B1 | 7/2007 | Kasai et al. | 381/97 |
| 7,266,501 B2 | 9/2007 | Saunders et al. | 704/500 |
| 7,330,557 B2 | 2/2008 | Fischer et al. | 381/313 |
| 7,415,117 B2 | 8/2008 | Tashev et al. | |
| 7,508,948 B2 | 3/2009 | Klein et al. | 381/66 |
| 7,567,845 B1 | 7/2009 | Avendano et al. | |
| 7,881,480 B2 | 2/2011 | Buck et al. | 381/94.1 |
| 8,036,767 B2 | 10/2011 | Soulodre | 700/94 |
| 8,103,006 B2 | 1/2012 | McGrath | |
| 8,180,067 B2 | 5/2012 | Soulodre | 381/92 |
| 2001/0036286 A1 | 11/2001 | Layton et al. | 381/304 |
| 2002/0037083 A1 | 3/2002 | Weare et al. | 381/58 |
| 2002/0037084 A1 | 3/2002 | Kakuhari et al. | 381/98 |
| 2002/0039425 A1 | 4/2002 | Burnett et al. | 381/94.7 |
| 2002/0159607 A1 | 10/2002 | Ford et al. | 381/103 |
| 2003/0007648 A1 | 1/2003 | Currell | 381/61 |
| 2003/0045953 A1 | 3/2003 | Weare | 700/94 |
| 2003/0061032 A1 | 3/2003 | Gonopolskiy | 704/200.1 |
| 2003/0072460 A1 | 4/2003 | Gonopolskiy et al. | 381/92 |
| 2003/0128848 A1 | 7/2003 | Burnett | 381/71.8 |
| 2003/0135377 A1 | 7/2003 | Kurianski et al. | 704/500 |
| 2003/0142842 A1 * | 7/2003 | Arai et al. | 381/300 |
| 2003/0169887 A1 | 9/2003 | Fujita et al. | 381/63 |
| 2003/0174845 A1 | 9/2003 | Hagiwara | 381/17 |
| 2003/0223603 A1 | 12/2003 | Beckman | 381/310 |
| 2004/0066940 A1 | 4/2004 | Amir | 381/94.2 |
| 2004/0223620 A1 | 11/2004 | Horbach et al. | 381/59 |
| 2004/0228498 A1 | 11/2004 | Sekine | 381/303 |
| 2004/0240676 A1 | 12/2004 | Hashimoto et al. | |
| 2004/0240697 A1 | 12/2004 | Keele, Jr. | 381/336 |
| 2004/0258255 A1 | 12/2004 | Zhang et al. | 381/92 |
| 2005/0053249 A1 | 3/2005 | Wu et al. | 381/310 |
| 2005/0069143 A1 | 3/2005 | Budnikov et al. | 381/63 |
| 2005/0129249 A1 | 6/2005 | Chabanne | 381/17 |
| 2005/0195984 A1 | 9/2005 | Miura et al. | 381/63 |
| 2005/0195988 A1 | 9/2005 | Tashev et al. | |
| 2005/0216211 A1 | 9/2005 | Nagatani | |
| 2005/0220312 A1 | 10/2005 | Kasai et al. | 381/97 |
| 2005/0232440 A1 | 10/2005 | Roovers | 381/92 |
| 2005/0249356 A1 | 11/2005 | Holmi et al. | 381/86 |
| 2005/0281408 A1 | 12/2005 | Kim et al. | 381/17 |
| 2005/0286727 A1 | 12/2005 | Otsuka | 381/18 |
| 2006/0039567 A1 | 2/2006 | Huang | 381/22 |
| 2006/0045275 A1 | 3/2006 | Daniel | 381/17 |
| 2006/0045294 A1 | 3/2006 | Smyth | 381/309 |
| 2006/0062410 A1 | 3/2006 | Kim et al. | 381/310 |
| 2006/0072766 A1 | 4/2006 | Klein et al. | |
| 2006/0088175 A1 | 4/2006 | Eid et al. | 381/104 |
| 2006/0098830 A1 | 5/2006 | Roeder et al. | 381/310 |
| 2006/0109992 A1 | 5/2006 | Roeder et al. | 381/310 |
| 2006/0126878 A1 | 6/2006 | Takumai et al. | 381/335 |
| 2006/0171547 A1 | 8/2006 | Lokki et al. | 381/92 |
| 2006/0222182 A1 | 10/2006 | Nakaishi et al. | 381/27 |
| 2006/0222184 A1 | 10/2006 | Buck et al. | 381/71.1 |
| 2006/0233382 A1 | 10/2006 | Watanabe | 381/56 |
| 2006/0256978 A1 | 11/2006 | Balan et al. | 381/94.7 |
| 2006/0269071 A1 | 11/2006 | Nakano | 381/17 |
| 2006/0274902 A1 | 12/2006 | Hume et al. | 381/17 |
| 2006/0280311 A1 | 12/2006 | Beckinger et al. | 381/17 |
| 2006/0280323 A1 | 12/2006 | Neidich et al. | 381/300 |
| 2007/0014417 A1 | 1/2007 | Fujita et al. | 381/17 |
| 2007/0019816 A1 | 1/2007 | Konagai | 381/59 |
| 2007/0036366 A1 | 2/2007 | Konagai et al. | 381/61 |
| 2007/0047743 A1 | 3/2007 | Taenzer et al. | 381/92 |
| 2007/0064954 A1 | 3/2007 | Booth et al. | 381/58 |
| 2007/0110250 A1 | 5/2007 | Bauck | 381/20 |
| 2007/0110268 A1 | 5/2007 | Konagai et al. | 381/335 |
| 2007/0129952 A1 | 6/2007 | Kenyon et al. | 704/500 |
| 2007/0154020 A1 | 7/2007 | Katayama | 381/17 |
| 2007/0230725 A1 | 10/2007 | Wang | 381/309 |
| 2007/0269063 A1 | 11/2007 | Goodwin et al. | |
| 2008/0232603 A1 | 9/2008 | Soulodre | 381/63 |
| 2008/0232617 A1 | 9/2008 | Goodwin et al. | 381/307 |
| 2008/0260175 A1 | 10/2008 | Elko | 381/73.1 |
| 2009/0062945 A1 | 3/2009 | Trautmann et al. | |
| 2009/0144063 A1 | 6/2009 | Beack et al. | |
| 2009/0182564 A1 | 7/2009 | Beack et al. | |
| 2010/0098265 A1 | 4/2010 | Pan et al. | |
| 2011/0081024 A1 | 4/2011 | Soulodre | 381/17 |

(56) References Cited

U.S. PATENT DOCUMENTS

| | | | |
|---|---|---|---|
| 2012/0063608 A1 | 3/2012 | Soulodre | 381/66 |
| 2012/0275613 A1 | 11/2012 | Soulodre | |

FOREIGN PATENT DOCUMENTS

| | | | |
|---|---|---|---|
| EP | 989543 A2 * | 3/2000 | |
| EP | 1 465 159 A1 | 10/2004 | G10L 21/02 |
| JP | 05-073082 | 3/1993 | G10K 15/00 |
| JP | 06324689 A | 11/1994 | |
| JP | 09258749 A | 10/1997 | |
| JP | 2003-005770 | 1/2003 | G10K 15/12 |
| JP | 2003-263178 | 9/2003 | G10K 15/00 |
| JP | 2003-271165 | 9/2003 | G10K 15/12 |
| JP | 2004093728 A | 3/2004 | |
| JP | 200512784 A | 1/2005 | |
| JP | 2005080124 A | 3/2005 | |
| JP | 2008512015 A | 4/2008 | |
| KR | 10-2006-0043338 | 5/2006 | |
| WO | WO 01/76319 A2 | 10/2001 | H04R 3/00 |
| WO | WO 03/053033 | 6/2003 | H04M 9/08 |
| WO | WO 2006/068009 A1 | 1/2006 | |
| WO | 2006011104 A1 | 2/2006 | |
| WO | 2006024850 A2 | 3/2006 | |
| WO | WO 2006/040734 A1 | 4/2006 | H04B 9/08 |

OTHER PUBLICATIONS

Griesinger, David, "Practical Processors and Programs for Digital Reverberation," *Proceedings of the AES 7th International Conference*, Audio Engineering Society, Toronto, May 1989, pp. 187-195, (11 pgs.).

Griesinger, David, "Spaciousness and Envelopment in Musical Acoustics," *Presented at the 101st Convention of the Audio Engineering Society*, Los Angeles, Nov. 8-11, 1996, Preprint #4401, 13 pages.

Griesinger, David, "General Overview of Spatial Impression, Envelopment, Localization, and Externalization," *Proceedings of the 15th International Conference of the Audio Engineering Society on Small Room Acoustics*, Denmark, Oct. 31-Nov. 2, 1998, pp. 136-149, (15 pgs.).

Griesinger, David, "Improving Room Acoustics Through Time Variant Synthetic Reverberation," *Presented at the 90th Convention of the Audio Engineering Society*, Paris, Feb. 1991, reprint #3014, 15 pgs.

Griesinger, David, "Room Impression Reverberance and Warmth in Rooms and Halls," *Presented at the 93rd Convention of the Audio Engineering Society*, San Francisco, Nov. 1992, Preprint #3383, 8 pages.

Griesinger, David, "Measures of Spatial Impression and Reverberance based on the Physiology of Human Hearing," Proceedings of the 11th International Audio Engineering Society Conference, May 1992, pp. 114-145, (33 pgs.).

Griesinger, David, "Multichannel Sound Systems and Their Interaction with the Room," *Presented at the 15th International Conference of the Audio Engineering Society*, Copenhagen, Oct. 1998, pp. 159-173, (16 pgs.).

Griesinger, David, "How Loud is My Reverberation?," *Presented at the 98th Convention of the Audio Engineering Society*, Paris, Feb. 1995, 7 pages.

Griesinger, David, "Spaciousness and Localization in Listening Rooms and Their Effects on the Recording Technique," *J. Audio Eng. Soc.*, vol. 34, No. 4, 1986, pp. 255-268, (16 pgs.).

Griesinger, David, "The Psychoacoustics of Apparent Source Width, Spaciousness, and Envelopment in Performance Spaces," *Acta Acoustics*, vol. 83, 1997, pp. 721-731, (11 pgs.).

Griesinger, David, "The Theory and Practice of Perceptual Modeling—How to Use Electronic Reverberation to Add Depth and Envelopment Without Reducing Clarity," material from David Griesinger's Internet Home Page, obtained from the Internet at: <www.world.std.com/~griesngr . . . >, undated but prior to May 2002, 28 pgs.

Griesinger, David, "Internet Home Page," obtained from the Internet at: <www.world.std.com/~griesnger/>, printed on Apr. 26, 2004, (9 pgs.).

Julia Jakka, "Binaural to Multichannel Audio Upmix", Helsinki University of Technology, Jun. 6, 2005.

Allen, J.B. et al., Multimicrophone Signal-Processing Technique to Remove Room Reverberation From Speech Signals, Oct. 1977, pp. 912-915, vol. 62, No. 4, Acoustical Society of America.

Tsoukalas, Dionysis E. et al., Speech Enhancement Based on Audible Noise Suppression, Nov. 1997, pp. 497-512, vol. 5, No. 6, IEEE.

Bradley, John S. et al., The Influence of Late Arriving Energy on Spatial Impression, Apr. 1995, pp. 2263-2271, Acoustical Society of America.

Widrow, Bernard et al., Adaptive Noise Cancelling: Principles and Applications, Dec. 1975, pp. 1692-1717, vol. 63, No. 12, IEEE.

Ramarapu, Pavan K. et al., Methods for Reducing Audible Artifacts in a Wavelet-Based Broad-Band Denoising System, Mar. 1998, pp. 178-190, vol. 46, No. 3, Audio Engineering Society.

Sambur, Marvin R., Adaptive Noise Canceling for Speech Signals, Oct. 1978, pp. 419-423, vol. ASSP-26, No. 5, IEEE.

Thiede, Thilo et al., PEAQ—The ITU Standard for Objective Measurement of Perceived Audio Quality, Jan.Feb. 2000, pp. 3-29, vol. 48, No. ½, Audio Engineering Society.

Johnston, James D., Transform Coding of Audio Signals Using Perceptual Noise Criteria, Feb. 1998, pp. 314-323, vol. 6, No. 2, IEEE.

Todd, Craig C. et al., AC-3: Flexible Perceptual Coding for Audio Transmission and Storage, $96^{th}$ Convention Feb. 26-Mar. 1, 1994, pp. 1-17, AES.

Levine, Scott N., A Switched Parametric and Transform Audio Coder, 1999, pp. 1-4, ICASSP, Phoenix, Arizona.

F. J. Harris, "On the Use of Windows for Harmonic Analysis with the Discrete Fourier Transform," Proc/. IEEE, vol. 6, No. 1, Jan. 1978, pp. 51-83.

Eargle, John. The Microphone Book. Focal Press, 2004. pp. 50-90.

Wu et al. "A One-Microphone Approach for Reverberant Speech Enhancement", 2003 IEEE International Conference on Acoustics, Speech and Signal Processing, pp. I-844 to I-847, Apr. 6-10, 2003, Hong Kong.

Baskind et al. "Pitch-Tracking of Reverberant Sounds, Application to Spatial Description of Sound Scenes", AES $24^{th}$ International Conference—Multichannel Audio: The New Reality, Jun. 26-28, 2003, Banff, Alberta, Canada.

Theile, Gunther "Wave Field Synthesis—a Promising Spatial Audio Rendering Concept", Proc. F the $7^{th}$ Int. Conference on Digital Audio Efects, Oct. 5-8, 2004, pp. 125-132.

Miyoshi, Masato et al., Inverse Filtering of Room Acoustics, Feb. 1988, vol. 36, No. 2, pp. 145-152, IEEE.

Borrallo et al., On the Implementation of a Partitioned Block Frequency Domain Adaptive Filter (PBFDAF) for Long Acoustic Echo Cancellation, vol. 27, No. 3, Jun. 1, 1992, pp. 301-315, Elsevier Science Publishers B.V.

Japanese Patent Office, Office Action of Japanese Patent Application No. 2013-227974, May 15, 2014, 7 pages.

Olswang, Benjamin et al., Separation of Audio Signals into Direct and Diffuse Soundfields for Surround Sound, May 2006, ICASSP 2006, pp. 357-360. IEEE.

* cited by examiner

SYSTEM FOR MODIFYING AN ACOUSTIC SPACE WITH AUDIO SOURCE CONTENT

PRIORITY CLAIM

This application is continuation of U.S. patent application Ser. No. 12/054,388 filed Mar. 25, 2008, entitled "System for Modifying an Acoustic Space with Audio Source Content," which is a continuation-in-part of U.S. patent application Ser. No. 11/533,707 filed Sep. 20, 2006 entitled "System for Extracting and Changing the Reverberant Content of an Input Signal," both of which are incorporated by reference.

BACKGROUND OF THE INVENTION

1. Technical Field

This invention relates to processing of audio source content, and more specifically to processing audio source content to modify acoustic characteristics of an acoustic space in which the audio source content drives loudspeakers.

2. Related Art

Audio source content can be any form of sound, such as a voice or music. Audio source content can be received and converted to electrical signals with any device sensitive to sound waves, such as a microphone. Audio systems can be used to amplify, adjust and transport electrical signals representative of received audio source content. Audio source content can be reproduced with a transducer, such as a loudspeaker, that converts the electrical signals to sound waves.

In general, audio source content is available in the form of either a live performance or a pre-recorded performance. With either recorded performances or live performances, the audio source content inherently includes acoustic characteristics related to the conditions and environment in which the sound was produced during the performance. Such acoustic characteristics include a level of reverberation caused by the acoustic space in which the sound was originally produced. The audio source content may also include a level of reverberation produced by electronic means. When such performances are re-produced in another acoustic space, the acoustic characteristics may be significantly altered by the conditions and environment in which the sound is being reproduced. In addition, when sound is created in an acoustic space or reproduced in an acoustic space, the acoustical characteristics of the acoustic space may have an undesirable effect on the sound.

It is often not convenient or impossible to measure the acoustic characteristics of an acoustic space in order to replicate sound previously generated in the acoustic space. For example, an audio recording of a singer in a concert hall includes acoustic characteristics of that particular concert hall however; access to the concert hall to measure the acoustic characteristics may be difficult. In addition, even with access to the concert hall, replication of the acoustic conditions at the time of the recording (e.g. location of the singer and the microphone, presence of an audience, ambient conditions, etc.) could be quite difficult. Therefore, a need exists to be able to modify an acoustic space with an audio signal so that production or reproduction of the audio signal in the acoustic space imparts desirable acoustic characteristics to the acoustic space or replicates sound production in another acoustic space.

SUMMARY

An audio signal processing system includes a decompose module and a reverberation generator module. The decompose module is configured to decompose an audio signal into a dry audio signal component and a reverberation audio signal component. Decomposition of the audio signal may be based on an estimated impulse response derived from the audio signal or from a predetermined estimated impulse response. The reverberation generator module is configured to combine the dry audio signal component with a modified reverberation component or an artificial reverberation component. The modified reverberation component may be based on the reverberation audio signal component from the audio signal. The artificial reverberation component may be generated with the reverberation generator module.

The combination of the dry audio signal component with the modified or artificial reverberation component may be used to produce reverberation-adjusted frequency spectra in a processed audio signal. The processed audio signal can be used to drive loudspeakers in an acoustic space. Use of the modified or artificial reverberation component instead of the reverberation audio signal component may provide modification of listener perceived acoustic characteristics of the acoustic space. Thus, the acoustic space may be acoustically modified with the processed audio signal to take on different perceived acoustical characteristics than the acoustic space would otherwise possess. For example, when the audio signal is a pre-recorded audio signal, the acoustic space could be modified with the processed audio signal to simulate the acoustic space in which the audio signal was recorded. In other examples, the acoustic space could be perceptually modified with the processed audio signal to take on any other desired acoustic related characteristics.

The audio signal processing system may also include a microphone processor module configured to receive one or more microphone input signals from one or more microphones included in an acoustic space. The microphone input signals may be separated into a dry signal component and a reverberation signal component. In addition, an estimated impulse response of the microphone input signals may be determined. The reverberation signal component of the microphone input signals may be modified with the audio signal processing system. In addition, an artificial reverberation component may be generated with the audio signal processing system. The dry signal component of the microphone input signal may be combined with the modified reverberation signal component of the microphone input signals or the artificial reverberation component to provide reverberation-adjusted frequency spectra in a processed audio signal. The processed audio signal may modify the acoustical characteristics of an acoustic space to achieve desired acoustical characteristics, such as improved speech intelligibility.

The audio processing system may also dynamically control the reverberation-adjusted frequency spectra in a processed audio signal to modify an acoustic space to take on desired acoustical characteristics. The estimated impulse response of the microphone input signal received by the microphone processor module may be used as a feedback signal. The audio signal processing system may dynamically modify a reverberation signal component prior to combination with a dry signal component in order to modify the acoustic characteristics of the acoustic space until the estimated impulse response derived from the microphone input signals substantially match a target impulse response, such as an estimated impulse response of an input audio signal.

Accordingly, an acoustic space may be dynamically modified with the audio signal processing system to take on the acoustical characteristics of another acoustic space. In addition, the acoustic space may maintain the acoustical characteristics of the other acoustic space as conditions affecting the acoustical characteristics of the acoustic space change. In addition, equalization in a reverberation-adjusted frequency spectra may be similarly controlled using the microphone input signal as a feedback signal and controlling the equalization of the reverberation-adjusted frequency spectra to match a target equalization.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The present invention provides a system for altering the reverberant component of a signal. This is accomplished generally by first obtaining a perceptually relevant estimate of the frequency-domain representation of the impulse response of the underlying reverberant system. Using this estimate of the impulse response, the signal may be processed so as to extract the reverberant component of the signal, thus obtaining an estimate of the dry signal and an estimate of the reverberant signal. In some examples, further processing may be applied to the dry signal and the reverberant signal.

The impulse response of an acoustic space may provide a complete description of the reverberant system. Using the example of a singer in a concert hall, the reverberant system (in this case, the concert hall) can be completely described by the impulse response between the singer and the recording microphone. Various acoustic spaces (e.g. a concert hall versus a bathroom) can have very different perceived reverberant conditions. These differences may be described by the differences in the impulse responses of the various acoustic spaces.

Figure 1:
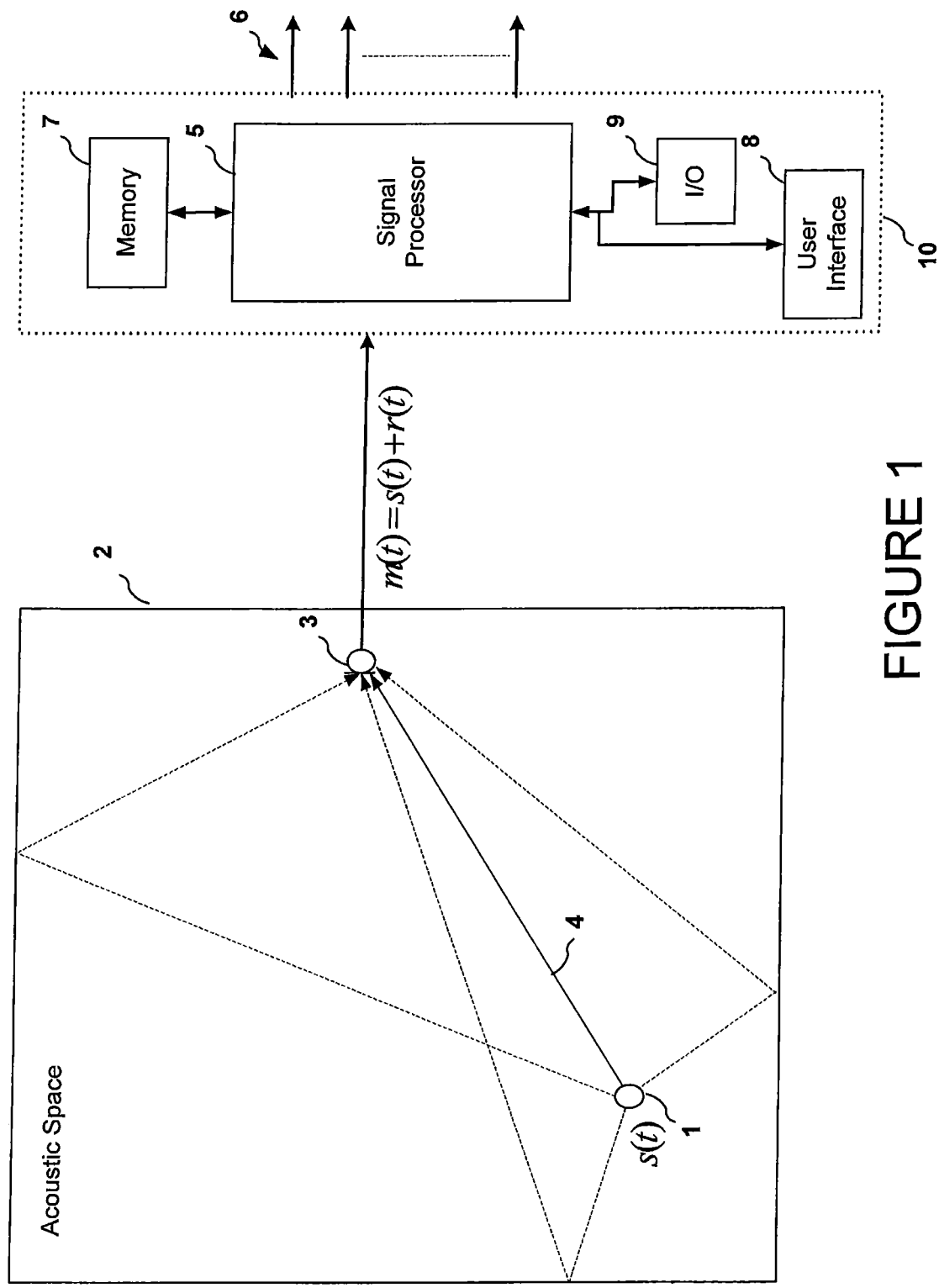
FIG. 1 depicts an example of a reverberant room with a sound source, a receiving microphone and an audio signal processing system.

The impulse response of a reverberant system can be better understood by considering FIG. 1 which shows an example of a sound source s(t) 1 in an acoustic space, such as a reverberant room 2, with a recording microphone 3 and an audio signal processing system 10. If the sound source 1 consists of an impulsive sound, then what is recorded at the microphone 3 will be the impulse response of the reverberant system between the sound source and the microphone 3. The impulse response includes the direct sound component 4, which is the first sound to reach the microphone 3 since it has the shortest distance between the sound source 1 and the microphone 3.

Following the direct sound component will be a series of reflected sounds (reflections) as shown by the dotted lines in FIG. 1. The time-of-arrival and the amplitude of the reflections determine the characteristics of the reverberant system. The reflections that arrive after the direct sound component make up the reverberant component. Therefore, one effect of the reverberant system is to add reverberation to the original dry signal. That is, the reverberation adds energy to the original dry signal. Mathematically, this is represented as m(t)=s(t)+r(t), where r(t) is the reverberant signal component that results from the signal s(t) passing through the reverberant system described by the impulse response h(t).

Figure 2:
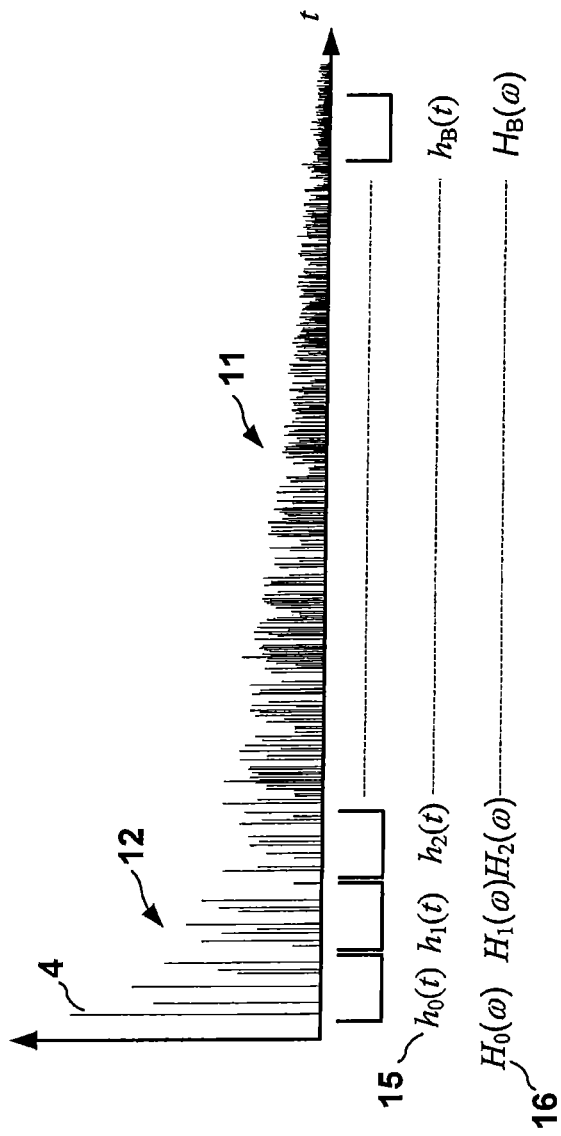
FIG. 2 depicts the components of an example impulse response with representation of block-based decomposition.

An example of an impulse response is given in FIG. 2. The first vertical line represents a direct sound component 4 while the remaining lines represent reflections. The height of each line indicates its amplitude and its location on the time axis (t) indicates its time-of-arrival at a sound measurement device, such as the microphone 3. As time goes on, the number of reflections increases to the point where it is no longer possible to identify individual reflections. Eventually the reflections evolve into a diffuse exponentially decaying system. This is typically referred to as the reverberant tail 11 of the impulse response.

The so-called early reflections 12 arrive soon after the direct sound component 4 and have a different perceptual effect than the reverberant tail. These early reflections provide perceptual cues regarding the size of the acoustic space 2 and the distance between the source 1 and the microphone 3. The early reflections 12 are also important in that they can provide improved clarity and intelligibility to a sound. The reverberant tail also provides perceptual cues regarding the acoustic space. It is common to divide an impulse response of an acoustic space into three conceptual parts—the direct sound 4, the early reflections 12, and the reverberant tail 11.

An acoustic space does not have a single impulse response. In the example of FIG. 1 there is an impulse response for the reverberant room 2 when the sound source 1 is located at a particular location and the microphone 3 is located at a predetermined location. If either the sound source 1 or microphone 2 is moved (even by a small amount) then a different impulse response is produced. Therefore, for any given acoustic space there are effectively an infinite number of possible impulse responses since there are effectively an infinite number of possible combinations of locations of the sound source 1 and the microphone 3.

An impulse response can also be viewed in the frequency domain by calculating its Fourier transform (or some other transform), and so a reverberant system can be described completely in terms of its frequency domain representation $H(\omega)$. The variable $\omega$ indicates frequency. The Fourier representation of the impulse response provides both a magnitude response and a phase response. Generally speaking the magnitude response provides information regarding the relative levels of the different frequency components in the impulse response, while the phase response provides information regarding the temporal aspects of the frequency components. Moving the sound source 1 or the microphone 3 from one location in the reverberant room 2 to a nearby location may not have much effect on the magnitude response, whereas it may have a quite dramatic effect on the phase response. That is, nearby impulse responses in an acoustic space tend to have similar magnitude responses, but can have very different phase responses.

Humans are not particularly sensitive to the differences in the impulse responses within a given acoustic space. For example, as we move around in an acoustic space while listening to someone talk we do not tend to hear dramatic changes in the sound of that person's voice even though the impulse response is changing continuously as we move. The reason that we do not hear dramatic differences is because the ear is primarily sensitive to the gross features of an impulse response and is not sensitive to the fine detail. More specifically, the ear is far less sensitive to changes in the phase response as compared to changes in the magnitude response of an impulse response. In general, the ear is quite insensitive to phase over short time periods (D. L. Wang and J. S. Lim, "The unimportance of phase in speech enhancement," IEEE Trans. Acoust. Speech, Signal Processing, vol. ASSP-30, no. 4, pp. 679-681, August 1982). As noted above, the various impulse responses in an acoustic space tend to have similar magnitude responses, but can have very different phase responses.

During operation of the audio signal processing system 10, a frequency domain estimate of the estimate of the magnitude of the reverberant energy in the input signal may be produced. This estimate of the magnitude of the reverberant energy is subtracted from the input signal, thus providing an estimate of the magnitude of the input signal. The phase of the reverberant input signal is used to approximate the phase of an original dry signal. As used herein, the term "dry signal," "dry signal component," "dry audio signal component," or "direct signal component" refers to an audio signal or a portion of an audio signal having almost no reverberant energy present in the audio signal. Thus the original dry signal 1 may have almost no reverberant energy since it consists almost entirely of the direct sound impulse 4 (FIG. 2). As used herein, the terms "reverberant energy," "reverberant input signal," "reverberant component," "reverberant signal component," "reverberation component," or "reverberation signal component" refer to the early reflections, and the reverberant tail of an audio signal. In addition, with respect to reverberation, as used herein, the term "component" or "components" refer to one or more components.

If the phase of the reverberant input signal is used to approximate the phase of an original dry signal using the entire impulse response as a whole, then it is likely that severe time-domain artifacts would be audible in the processed signal. Therefore, the audio signal processing system 10 is configured to divide the estimate of the overall impulse response into short blocks, and processing is performed in a block-based manner. The pre-determined length of the blocks is short enough that the human ear does not perceive any time-domain artifacts due to errors in the phase of the processed output signals.

In FIG. 1, the example audio signal processing system 10 includes at least a signal processor 5, a memory 7, a user interface 8, and an input/output (I/O) module 9. Examples of audio signal processing systems include a head unit in a vehicle, an audio amplifier, a consumer audio receiver, a processor for a recording studio, a computer, a game console such as an Xbox, a DVD player, a video player, a television, a processor for a practice booth or a concert hall, a karaoke controller or any other device or system capable of processing audio signals. In other example audio systems, additional components, such as audio source devices, may be depicted as included in the audio signal processing system 10. Audio source devices may include a radio tuner, a compact disc player, a mobile telephone, a navigation system, an MP3 player, or any other system or device capable of generating electronic audio signals representative of audio information.

The signal processor 5 may be any form of logic processing device or devices, analog or digital, capable of executing instructions or code. Example signal processors include a digital signal processor (DSP) and a micro processor. The memory 7 may be any form of data storage mechanism accessible by the signal processor 5 or any combination of such forms, such as, a magnetic media, an optical disk, a random access memory (RAM), flash memory, and/or electrically erasable programmable read-only memory (EEPROM).

The user interface 8 may include any visual, audible and/or tactile mechanism that allows a user to provide and receive information from the audio signal processing system 10. For example, the user interface 8 may include a display that converts electrical signals into information presented to the user in some visually perceivable form. Some examples of a display include a liquid crystal display ("LCD"), a cathode-ray tube ("CRT") display, an electroluminescent display ("ELD"), a heads-up display ("HUD"), a plasma display panel ("PDP"), or a vacuum fluorescent display ("VFD"). The user interface 8 may receive electrical signals from, and provide electrical signals to the signal processor 5 that are representative of interaction of the user with the audio signal processing system 10. In one example, the user interface 8 may include a user input device that is electrically connected to the signal processor 10. The input device may be a wheel button, a joystick, a keypad, a touch-screen configuration or any other device or mechanism capable of receiving an input from a user and providing such an input as an input signal to the signal processor 5. In another example, the display may be a touch-screen display that transmits signals to the signal processor 5, or any other module or device included in the audio signal processing system 10. Information such as the area on the display that was touched by the user, the length of time the user touched the display, the direction the user moves his finger against the display, etc., may be conveyed as different signal inputs to the audio signal processing system 10.

The user interface 8 may also include a voice-based interface that allows the user to audibly interact with audio signal processing system 10. The voice-based interface may allow a user to provide input to the audio signal processing system 10 using a microphone and voice recognition software. The user's speech may be converted to electronic signals using the microphone and processed using the voice recognition software to generate text data for the signal processor 5.

The memory 7 may include computer code. The computer code may be in the form of logic and/or instructions that are executable by the signal processor 5. Execution of the instructions by the signal processor 5 may provide the functionality of the audio signal processing system 10. The memory may also provide for storage of audio related data, user settings and any other information related to the operation of the audio signal processing system 10. Audio related data may include predetermined acoustic characteristics; predetermined attributes of an acoustic space; amplifier, microphone and loudspeaker response and calibration data; data related to a level and characteristics of noise in an acoustic space; and/or any other parameters related to processing audio source content.

The I/O module 9 may include hardware and or software capable of receiving and outputting analog and/or digital signals. The I/O module 9 may include converters, such as analog-to-digital (A/D) and digital-to-analog (A/D) (D/A) converters, filters, or any other signal conditioning or conversion mechanism. In general, the signal processor 5 executes code to operate on the input signal m(t) 3 and decompose it into different components 6. These components may consist of an estimate $\tilde{s}(t)$ of the original dry signal s(t) 1 and an estimate $\tilde{r}(t)$ of the reverberant component r(t). The estimate $\tilde{r}(t)$ of the reverberant component may be further decomposed into sub-components representing estimates $\tilde{r}_1(t), \tilde{r}_2(t), \ldots, \tilde{r}_K(t)$, of the different parts of the reverberant signal. The signal processor 5 may also modify any or all of the dry and reverberant signal component estimates. The signal processor 5 may operate on input signal m(t) 3 in the frequency domain.

Figure 3:
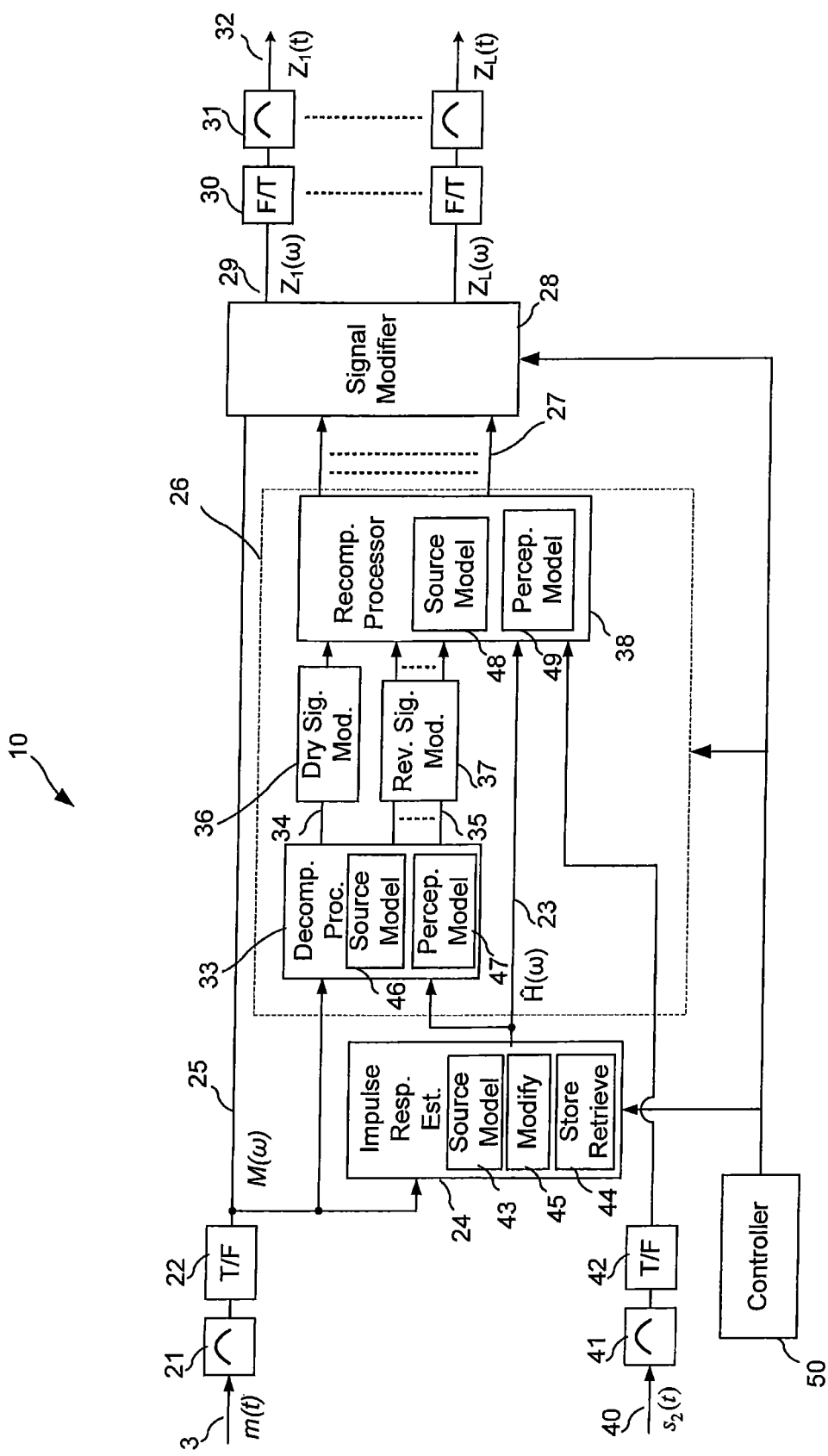
FIG. 3 illustrates a schematic diagram of the functionality of an example signal processor included in the audio signal processing system of FIG. 1.

FIG. 3 illustrates an example of the functionality of the signal processor 5 during execution of the code stored in the memory 7. The functionality available when the corresponding code is executed may be in the form of modules executable with the signal processor 5. In FIG. 3, modules executable with the signal processor 5 include a windowing function 21, a time-to-frequency domain processor 22, and an impulse response estimator 24.

The input signal m(t) 3 may be converted to a frequency domain representation by applying the windowing function 21, such as an overlapping analysis window to a block of time samples. The time-to-frequency domain processor 22 produces an input spectrum in response to input time samples. To achieve time-to-frequency domain conversion, the time-to-frequency domain processor may execute a transform, such as a Discrete Fourier Transform (DFT), wavelet transform, or other transform, or may be replaced by or may implement an analysis filter bank. In other examples, the input signal m(t) may not be derived from a microphone 3 as depicted in FIG. 1. The audio signal processing system 10 system can operate on any audio signal regardless of how it was produced.

The Impulse Response Estimator 24 may operate on the frequency domain representation of the input signal M(ω) 25 to produce a perceptually relevant estimate $\tilde{H}(\omega)$ 23 of the frequency domain representation of the impulse response H(ω). The Impulse Response Estimator 24 may operate on the input signal to produce a block-based estimate of the impulse response H(ω). The block-based estimate of the impulse response may consist of a plurality of block estimates $\tilde{H}_0(\omega), \tilde{H}_1(\omega), \tilde{H}_2(\omega), \ldots$ 16 which correspond to frequency domain estimates of the blocks of the impulse response $h_0(t), h_1(t), h_2(t), \ldots$ 15 as shown in FIG. 2.

The functionality of the signal processor 5 may also include modules in the form of a reverberation adjustment processor 26, a signal modifier 28, a frequency-to-time domain processor 30, and a windowing function 31. The reverberation processor 26 may include a Decompose Processor 33, a Dry Signal Modifier 36, a Reverberant Signal Modifier 37, and a Recompose Processor 38. The reverberation adjustment processor 26 is configured to adjust frequency components of the input signal spectrum M(ω) in response to one or more frequency-domain estimates of one or more block-based frequency-domain representations 16 (FIG. 2) of the impulse response to produce as outputs one or more reverberation-adjusted frequency spectra 27 that include adjusted frequency components of the input signal spectrum M(ω). The reverberation adjustment processor 26 may derive one or more reverberation-adjusted frequency spectra 27 that will pass, amplify, or attenuate a component of the input signal m(t) based on whether that component is part of the original dry signal or part of the reverberant signal.

The signal modifier 28 is configured to modify and mix frequency components of the reverberation-adjusted frequency spectra 27 as well as the input signal spectrum 25 to produce one or more output frequency spectra $Z_1(\omega) Z_2(\omega), \ldots, Z_L(\omega)$ 29.

The frequency-to-time domain processor 30 may be one or more processor modules that are operable to produce output frames of time samples $z_1(t), z_2(t), \ldots, z_L(t)$ 32 in response to the output frequency spectra. The frequency-to-time domain processor 30 may perform the inverse function of the time-to-frequency domain processor 22. Consequently, in each frequency-to-time domain signal processor 5 may perform an inverse transform, such as an Inverse Discrete Fourier Transform (IDFT).

Within the reverberation processor 26, the Decompose Processor 33 may receive and use the block-based estimate $\tilde{H}(\omega)$ 23 of the frequency domain representation of the impulse response H(ω) from the Impulse Response Estimator 24. The Decompose Processor 33 may operate on the frequency domain representation of the input signal M(ω) 25 to produce an estimate of the original dry signal $\tilde{S}(\omega)$ 34 and estimates $\tilde{R}_1(\omega), \tilde{R}_1(\omega), \ldots, \tilde{R}_K(\omega)$ 35 of one or more components of the reverberant signal.

The Dry Signal Modifier 36 is configured to adjust frequency components of the estimate $\tilde{S}(\omega)$ 34 of the original dry signal to produce a modified estimate $\tilde{S}'(\omega)$ of the original dry signal. The Reverberant Signal Modifier 37 is configured to independently adjust frequency components of one or more of the estimates $\tilde{R}_1(\omega), \tilde{R}_1(\omega), \ldots, \tilde{R}_K(\omega)$ of the reverberant signal components to produce modified estimates of the reverberant signal components.

Modification of the dry signal and the reverberant signal may be independent and unrelated. For example, a first equalization (first EQ) may be applied to the direct signal component and a separate second equalization (second EQ) may be applied to the reverberant signal component. The first EQ may be applied in Dry Signal Modifier 36 and the second EQ may be applied in the Reverberant Signal Modifier 37. Following independent equalization, the dry and reverberant signal components may be recombined to form one or more audio signals. The audio signals may be sent to loudspeakers. Since the two signal components are being equalized separately, better subjective results may be obtained.

The recompose processor 38 is configured to take the modified estimate $\tilde{S}'(\omega)$ of the original dry signal and the modified estimates $\tilde{R}_1'(\omega), \tilde{R}_1'(\omega), \ldots, \tilde{R}_K'(\omega)$ of the reverberant signal components and produce one or more reverberation-adjusted frequency spectra 27.

In FIG. 3, a second input signal $s_2(t)$ 40 that is a dry component signal may be provided to the recompose processor 38 to add reverberation present in the second input signal $s_2(t)$ 40 to the input signal m(t). The second input signal $s_2(t)$ 40 may be converted to a frequency domain representation by applying an overlapping analysis window 41 to a block of time samples. A time-to-frequency domain processor 42 may produce an input spectrum in response to the input time samples. The Recompose Processor 38 may combine the input signal $s_2(t)$ 40 with a reverberation component. The characteristics of the reverberation component combined with the input signal $s_2(t)$ 40 may be determined with the Recompose Processor 38 by the block-based estimate of the impulse response 23 of the input signal $M(\omega)$ 25.

The performance of the audio signal processing system 10 may be improved by including one or more source models 43 with the Impulse Response Estimator 24. A source model 43 may be used to account for the physical characteristics of the reverberant system in which the input signal $M(\omega)$ 25 was generated. For example, the response of a reverberant system (room) tends to decay exponentially over time. Thus, estimates generated with the Impulse Response Estimator 24 may be confirmed as being acceptable based on the source model 43.

The block-based estimate derived by the Impulse Response Estimator 24 can be stored in the memory 7 (FIG. 1), and retrieved for later use with a Store Retrieve module 44. An impulse response modifier 45 is configured to independently adjust the frequency components of the block-based estimates of the impulse response to produce modified block-based estimates of the impulse response. In other examples, the source model 43 and the impulse response modifier 45 can be combined to form a combined model. In still other examples, one or both of the source model 43 and the impulse response modifier 45 may be omitted.

Performance of the Decompose Processor 33 may be improved by including a source model 46 stored in the memory 7. One goal of a source model may be to account for the physical characteristics of the dry sound source when deciding how much a given frequency band should be attenuated or amplified. The performance of the Decompose Processor 33 may also be improved by including a perceptual model 47. One goal of the perceptual model 47 may be to limit the amount by which frequency bands are modified such that, in extracting the dry signal, an unwanted reverberant component is only attenuated to the point where it is masked by the dry signal. Similarly, in extracting the reverberant signal with the Decompose Processor 33, an unwanted dry signal component is only attenuated to the point where it is masked by the reverberant signal. In other examples, aspects of the perceptual model 47 and the source model 46 may be combined to form a component model. In still other examples, the source model 46 and the perceptual model 47 may be omitted.

The performance of the Recompose Processor 38 may be improved by including a source model 48. The source model 48 may be configured to account for the physical characteristics of the dry sound source when deciding how much a given frequency band should be attenuated or amplified. The performance of the Decompose Processor 38 may also be improved by including a perceptual model 49. The perceptual model 49 may be configured to limit the amount by which frequency bands are modified such that, in deriving the reverberation-adjusted spectra 27, unwanted components of the dry and reverberant signals may be attenuated to a predetermined point, such as the point where the dry and reverberant signals are masked by the desired signal components. In other examples, the perceptual model 48 and the source model 49 may be combined to form a component model, or the perceptual model 48 and the source model 49 may be omitted. In addition, in other examples, the source models 46, 48 and the perceptual models 47, 49 may be combined and shared between the decompose processor 33 and the recompose processor 38.

The modules executable with the signal processor 5 may also include a controller 50. The operations of the various modules included in the audio signal processing system 10 may be independently controlled by the controller 50.

As previously discussed, during operation, the audio signal processing system 10 may extract a description of the perceptually relevant aspects of a reverberant system based on the input signal. In addition, the audio signal processing system 10 may perform an analysis of the reverberant system. Further, the audio signal processing system 10 may modify or reduce the reverberant characteristics in an audio source input signal such as a recording. In addition or alternatively, the audio signal processing system 10 may impose reverberant characteristics onto an audio source input signal, such as a recorded audio signal.

Some audio recordings (film, music, television, etc.) are monophonic. That is they were recorded onto only one audio channel. Stereo or two channel audio recordings are typically more pleasing since spatial aspects of the reverberant characteristics of an acoustic space in which the recording was made may be reproduced upon playback. Numerous processes have been developed in an effort to convert monophonic recordings to a stereophonic format. These techniques are limited by the fact that they process both the direct sound component and the reverberant component together at the same time. With the audio signal processing system 10, the direct sound component and reverberant component of a monophonic recording are processed separately to convert monophonic recordings to a stereophonic format. With the audio signal processing system 10, this is achieved by decomposing a source audio signal into a direct sound component and a reverberant component.

Whereas a stereo system has two channels (and thus two loudspeakers) a multichannel surround system has multiple channels. One example of a multichannel surround system uses five channels and hence five loudspeakers. The audio signal processing system 10 may also be configured to receive a mono or stereo audio signal and produce a multichannel audio signal.

As previously discussed, the audio signal processing system 10 decomposes the stereo (or mono) signal into its direct sound component and its reverberant component. With the original signal decomposed into direct and reverberant components, the audio signal processing system 10 can create multichannel audio signals by processing the direct sound component through a multichannel artificial reverberation device. Since the reverberant component has been removed, additional reverberation provided by the artificial reverberation device does not add to the reverberant component that was present in the original audio signal. Thus, combination of the reverberation component from the audio signal and the additional reverberation from the artificial reverberation device does not occur since the reverberant component of the audio signal has been removed. In addition, a mismatch between the artificial reverberation and the reverberation in the audio signal is avoided.

Alternatively or in addition, with the original signal decomposed into direct and reverberant components, the audio signal processing system 10 may be configured to create multichannel audio signals by providing the direct component to drive the front loudspeakers in order to preserve the frontal placement of the instruments in the reproduced sound field. In addition, the audio signal processing system 10 may be configured to drive the rear loudspeakers with the reverberant component of the original signal. Alternatively, the reverberant component may be decomposed into sub-components and distributed across all of the loudspeakers in an appropriate manner. This approach may advantageously create a multichannel signal entirely from the components of the original recording, thus creating a more natural sounding result.

In general, if one had a recording of a sound in a reverberant system and one could somehow directly measure the acoustic characteristics of that reverberant system, then it would be possible to mathematically invert the reverberant system and completely recover the original dry sound. This process is known as inverse filtering. However inverse filtering cannot be done without precise measurements of the exact acoustic characteristics of the reverberant system. Moreover, the resulting inverse filter is specific to that one set of acoustic characteristics. It is not possible to use inverse filtering to recover the original dry signal from a recording in a given reverberant system using the acoustic characteristics measured from a different reverberant system. For example, an inverse filter derived for one location in a acoustic space is not valid for any other location in the same acoustic space. Other problems with inverse filters are that they can be computationally demanding and they can impose a significant delay onto the resulting signal. This delay may not be acceptable in many real-time applications. The audio signal processing system 10 achieves the benefits of inverse filtering while overcoming the limitations that make it impractical in most real-world applications.

The audio signal processing system 10 is also configured to process the audio signal to compensate for acoustical characteristics of an acoustic space. There are many situations where the acoustical characteristics of an acoustic space are not advantageous for a given application. For example, the acoustical characteristics of the interior of a vehicle are not typically well-suited for listening to reproduced music. Similarly, the acoustical characteristics of the interior of a vehicle are not typically well-suited for speech communications between passengers in the front and rear seats. The audio signal processing system 10 is configured to alter or modify the acoustical characteristics of an acoustic space such that the resulting acoustical characteristics are more suitable for the given application. Moreover, the audio signal processing system 10 is variably configurable such that the acoustical characteristics of a given acoustic space can be altered to suit different applications.

The audio signal processing system 10 may also vary the acoustical characteristics to alter the perceived size of an acoustic space. The acoustical characteristics of an acoustic space provide the listener with perceptual cues regarding the size (length, width, and height) of the space. In one example, the audio signal processing system 10 may alter the acoustical characteristics of a small acoustic space to make listeners perceive that they are in a larger acoustic space. In another example, the audio signal processing system 10 may alter the acoustical characteristics of an acoustic space with a low ceiling such that the perceptual effects of the low ceiling are minimized. These alterations to the perceived acoustical characteristics of an acoustic space can make it a more comfortable environment for the listener.

As used herein, the terms "source room" shall refer to an acoustic space in which an audio signal is recorded (captured). In addition, the terms "playback room" shall refer to an acoustic space in which an audio signal is reproduced over loudspeakers for a listener. In some instances, the source room may be entirely artificially generated via some form of electronic processing. Thus, any combination of acoustic or electronically generated reverberation found in an audio signal will be considered to have been created by the source room.

In some situations, the same acoustic space may act as both the source room and the playback room. For example, when listening to music inside a vehicle, the audio signal processing system 10 may alter the acoustical characteristics of the vehicle (the playback room) to be more appropriate for music reproduction. In addition, the audio signal processing system 10 may alter the acoustical characteristics of vehicle's interior (source room) to be more suitable for speech intelligibility.

As previously described, there are numerous situations where the audio signal processing system 10 may adjust the reverberation found in an audio signal when production of an audible signal in an acoustic space occurs. By modifying the direct sound component and/or the reverberant sound component of the audio signal, the audio signal processing system 10 may optimize the reverberation of an audio signal for an acoustic space. In addition, the audio signal processing system 10 may modify the reverberation without having to directly measure the acoustic space in which audio source material was recorded.

In one example the audio signal processing system 10 may decompose an input signal in the form of audio source material into its original dry signal component and reverberant component. In addition, the reverberant component may be further decomposed into multiple sub-components. This example system can be used in numerous applications including altering a speech or music signal to obtain the desired reverberant characteristics, enhancing the intelligibility of a speech signal, and creating additional audio channels from a monophonic, stereo or multichannel input signal.

This example of the audio process system 10 is described for the case where the audio source material input signal is monophonic. The monophonic signal is the input signal m(t) 3 that consists of a dry sound source s(t) 1 combined with a reverberant component r(t), where r(t) is the result of s(t) passing through the reverberant system having an impulse response h(t). In other examples, the input signal 3 may be a multi-channel input signal (including a stereo input signal) that is processed by the audio signal processing system 10.

The input signal m(t) is converted to a frequency domain representation at 22. Conversion of the input signal m(t) may be accomplished with any frequency to time conversion technique, such as a fast implementation of the Discrete Fourier Transform (DFT) employed with the windowing function 21, such as a 50% overlapping root-Hanning window. In other examples, other frequency domain representations may be employed, including but not limited to a discrete cosine transform, or a wavelet transform. Alternatively, a filter bank may be employed to provide a frequency domain representation. Also, other windowing functions may be employed and the amount of overlapping is not restricted to 50%. Zero-padding of time samples may be used in the time-to-frequency conversion to reduce any temporal aliasing artifacts that may result from processing. The frequency domain representation of the input signal is $M(\omega)$ 25.

The Impulse Response Estimator 24 may operate on the frequency domain representation of the input signal to produce a block-based estimate of the frequency domain representation of the impulse response $\hat{H}(\omega)$ 23. In FIG. 2, the impulse response h(t) is divided into B+1 blocks consisting of $h_0(t), h_1(t), \ldots, h_B(t)$ 15 with corresponding frequency domain representations $H_0(\omega), H_1(\omega), \ldots, H_B(\omega)$ 16. In this example, all the blocks are the same size, each having a length of D. In one example, the length D may be between about 10 ms and about 80 ms. In another example, the length of D can be between about 30 ms and about 50 ms. In still another example, D can be about 40 ms. The Impulse Response Estimator 24 may produce a set of perceptually relevant estimates of $H_0(\omega), H_1(\omega), \ldots, H_B(\omega)$. In this example, the perceptually relevant estimates $\tilde{H}_0(\omega), \tilde{H}_1(\omega), \ldots, \tilde{H}_B(\omega)$ are based on estimates of the magnitudes of the impulse response blocks $H_0(\omega), H_1(\omega), \ldots, H_B(\omega)$, respectively.

The impulse response h(t) can be approximated by a finite impulse response (FIR) filter, provided that the filter is of sufficient length. Therefore, the input signal m(t) can be obtained by processing the dry signal s(t) through an FIR filter having an impulse response equal to h(t). This filtering or convolution operation can be equivalently implemented using, for example, the block-based representation 15 of the impulse response. This block-based implementation is shown in FIG. 4.

Figure 4:
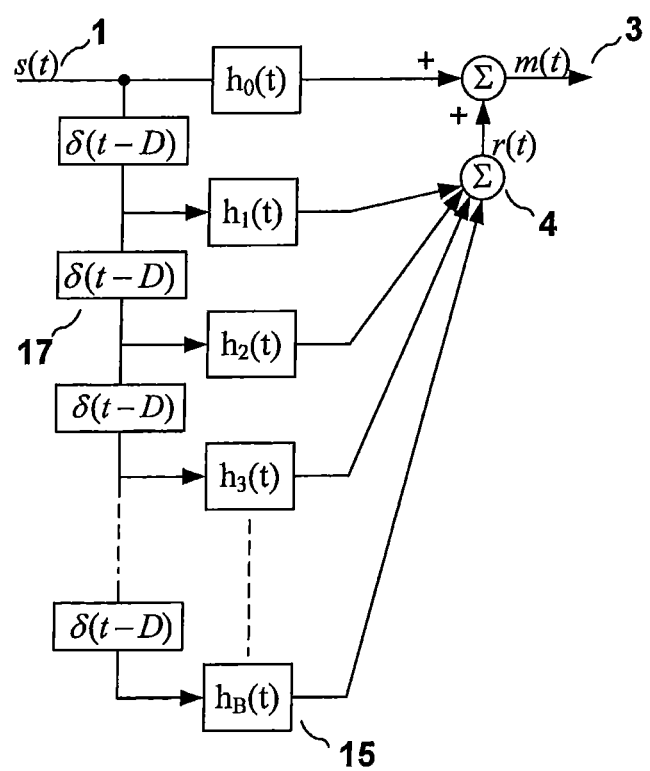
FIG. 4 depicts block-based convolution in the time domain.

In FIG. 4, the signal s(t) may be processed through B+1 FIR filters having impulse responses equal to $h_0(t)$, $h_1(t), \ldots, h_B(t)$. In order to time-align the outputs of these FIR filters, the signal s(t) may be delayed by a series of delay elements $\delta(t-D)$ 17. Each delay element provides a delay of D samples, which corresponds with the length of the block FIR filters. Each delay element can be implemented as an FIR filter of length D having all but the last filter tap equal to zero and the last filter tap equal to 1. The block-based FIR filtering operation can be described mathematically as follows, $$m(t) = s(t)*h_0(t) + s(t)*\delta(t-D)*h_1(t) + \ldots + s(t)*\delta(t-BD)*h_B(t)$$

or equivalently, $$m(t) = \sum_{i=0}^{B} s(t) * \delta(t - iD) * h_i(t)$$

where * represents the convolution operation.

In FIG. 4, this mathematical description may be extended to show the direct signal component and the reverberant component explicitly as follows, $$m(t) = s(t) * h_0(t) + r(t)$$

$$m(t) = s(t) * h_0(t) + \sum_{i=1}^{B} s(t) * \delta(t - iD) * h_i(t)$$

where $$s(t)*h_0(t)$$

includes the direct signal component, and $$r(t) = \sum_{i=1}^{B} s(t) * \delta(t - iD) * h_i(t)$$

is the reverberant signal component. In practice, because $h_0(t)$ is of length D, part of the initial portion of the reverberant signal may be in $s(t)*h_0(t)$. This is typically not a problem if D is chosen to be sufficiently short. If D is sufficiently short, then the portion of the reverberant signal within $s(t)*h_0(t)$ will not be audible due to masking properties of the human auditory system. Therefore, $s(t)*h_0(t)$ may be a perceptually relevant representation of the direct signal component, while r(t) may be a perceptually relevant representation of the reverberant signal component.

Figure 5:
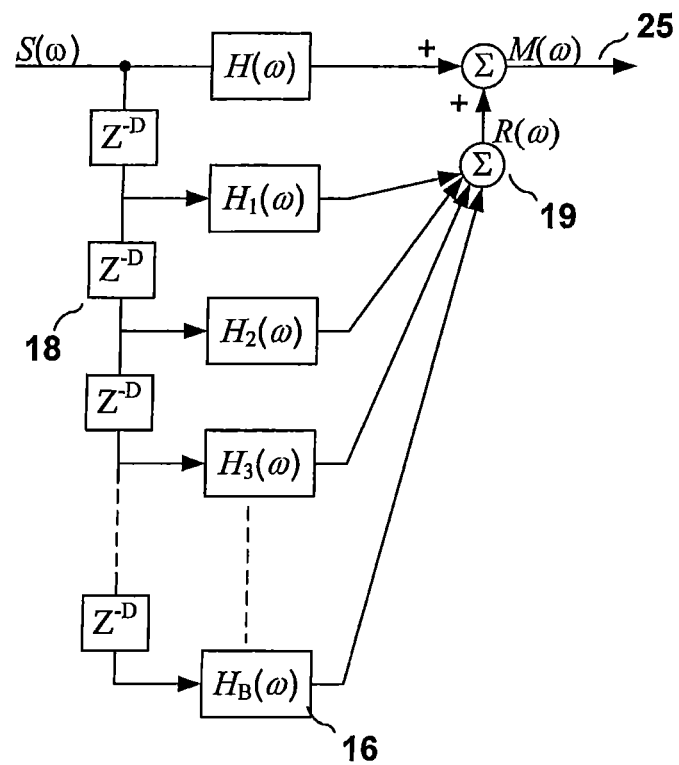
FIG. 5 depicts block-based convolution in the frequency domain.

Convolution in the time domain is equivalent to multiplication in the frequency domain. As such, the block-based FIR filtering process in FIG. 4 can be alternatively performed in the frequency domain as shown in FIG. 5. In FIG. 5, the B+1 FIR filters $h_0(t), h_1(t), \ldots, h_B(t)$ of FIG. 4 are replaced by their frequency domain equivalents $H_0(\omega), H_1(\omega), \ldots, H_B(\omega)$ 16. The delay elements are denoted by $Z^{-D}$ 18, where D represents the length of the delay The frequency domain processing can therefore be described as, $$M(\omega) = S(\omega)H_0(\omega) + S(\omega)z^{-D}H_1(\omega) + \ldots + S(\omega)z^{-BD}H_B(\omega)$$

or equivalently, $$M(\omega) = \sum_{i=0}^{B} S(\omega) z^{-iD} H_i(\omega)$$

In FIG. 5 this mathematical description may be extended to show the direct signal component and the reverberant component explicitly as follows, $$M(\omega) = S(\omega)H_0(\omega) + R(\omega)$$

$$M(\omega) = S(\omega)H_0(\omega) + \sum_{i=1}^{B} S(\omega) z^{-iD} H_i(\omega)$$

where $$S(\omega)H_0(\omega)$$

is the frequency domain representation containing the direct signal component, and $$R(\omega) = \sum_{i=1}^{B} S(\omega) z^{-iD} H_i(\omega)$$

is the frequency domain representation of the reverberant signal component 19.

The effects of an FIR filter can be undone using an appropriate infinite impulse response (IIR) filter. Therefore, if the B+1 FIR filters $h_0(t), h_1(t), \ldots, h_B(t)$ are known, then the original dry signal s(t) may be recovered from input signal m(t) using an appropriate IIR filter structure. The original dry signal can also be recovered if the frequency domain representations $H_0(\omega), H_1(\omega), \ldots, H_B(\omega)$ 16 of the FIR filters are known. The audio signal processing system 10 makes use of this concept.

In many situations it is not possible to measure or derive the exact values of $H_0(\omega), H_1(\omega), \ldots, H_B(\omega)$ 16 and thus it is not possible to exactly recover the original dry signal s(t) from the input signal m(t). With the audio signal processing system 10, perceptually relevant estimates of $H_0(\omega), H_1(\omega), \ldots, H_B(\omega)$ 16 may be used to derive an estimate of $S(\omega)$. These perceptually relevant estimates $\tilde{H}_0(\omega), \tilde{H}_1(\omega), \ldots, \tilde{H}_B(\omega)$ are based on estimates of the magnitudes of $H_0(\omega), H_1(\omega), \ldots, H_B(\omega)$ 16, respectively.

In FIG. 3, the block-based estimate of the frequency domain representation of the impulse response $\tilde{H}(\omega)$, 23 is provided by the Impulse Response Estimator 24 to the Decompose Processor 33. The Decompose Processor 33 may operate on the frequency domain representation of the input signal $M(\omega)$ 25 to produce an estimate of the direct signal component 34 and an estimate of the reverberant components 35.

Figure 6:
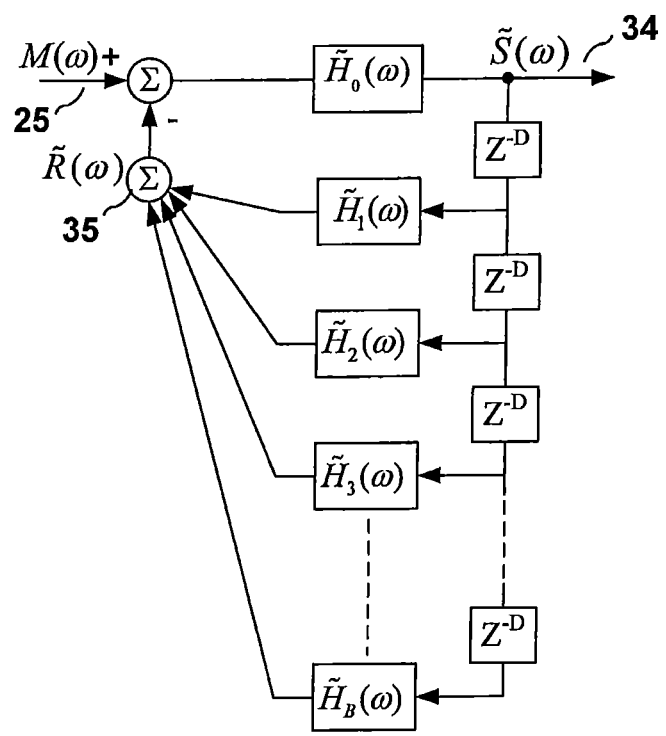
FIG. 6 depicts frequency domain block-based decomposition of a signal into dry and reverberant components.

In FIG. 6, the Decompose Processor 33 may be configured to use the perceptually relevant filter estimates $\tilde{H}_0(\omega)$, $\tilde{H}_1(\omega), \ldots, \tilde{H}_B(\omega)$ to create a block-based IIR filter structure. The IIR filter structure may take $M(\omega)$ 25 as its input and produces an estimate of the spectrum of the direct signal component $\tilde{S}(\omega)$ 34 as well as an estimate of the spectrum of the reverberant signal component $\tilde{R}(\omega)$ 35. The process can be described mathematically as follows, $$\tilde{S}(\omega)\tilde{H}_0(\omega) = M(\omega) - \left(S(\omega)z^{-D}\tilde{H}_1(\omega) + \ldots + S(\omega)z^{-BD}\tilde{H}_B(\omega)\right)$$

$$\tilde{S}(\omega) = \frac{M(\omega) - \left(S(\omega)z^{-D}\tilde{H}_1(\omega) + \ldots + S(\omega)z^{-BD}\tilde{H}_B(\omega)\right)}{\tilde{H}_0(\omega)}$$

For a given block of the input signal $M_0(\omega)$, $M_0(\omega)$ consists of the current block of the dry signal component convolved with $H_0(\omega)$, plus the previous block of the dry signal component convolved with $H_1(\omega)$, and so on for the B previous blocks of the dry signal component. A subscript may be used to indicate the block of the dry signal component, and so $S_i(\omega)$ represents the frequency domain representation of the previous ith block of the dry signal component. Given this, the operation of the Decompose Processor 33 can be described mathematically as, $$\tilde{S}_0(\omega)\tilde{H}_0(\omega) = M_0(\omega) - \left(\tilde{S}_1(\omega)\tilde{H}_1(\omega) + \ldots + \tilde{S}_B(\omega)\tilde{H}_B(\omega)\right)$$

$$\tilde{S}_0(\omega) = \frac{M_0(\omega) - \left(\tilde{S}_1(\omega)\tilde{H}_1(\omega) + \ldots + \tilde{S}_B(\omega)\tilde{H}_B(\omega)\right)}{\tilde{H}_0(\omega)}$$

where $\tilde{S}_i(\omega)$ is an estimate of the true value of $S_i(\omega)$. In this example $\tilde{H}_0(\omega)$ is assumed to be equal 1, thus giving, $$\tilde{S}_0(\omega) = M_0(\omega) - (\tilde{S}_1(\omega)\tilde{H}_1(\omega) + \ldots + \tilde{S}_B(\omega)\tilde{H}_B(\omega))$$

Therefore, an estimate of the current block of the dry signal component 34 may be obtained from the estimates of previous blocks of the dry signal component 34, as well as the block-based estimates of the impulse response of the reverberant system in which the audio source material was created. Where $(\tilde{S}_1(\omega)\tilde{H}_1(\omega) + \ldots + \tilde{S}_B(\omega)\tilde{H}_B(\omega))$ of the above equation is an estimate of the reverberant signal component 35. That is, $$\tilde{R}_0(\omega) = \tilde{S}_1(\omega)\tilde{H}_1(\omega) + \ldots + \tilde{S}_B(\omega)\tilde{H}_B(\omega)$$

In this example the overall reverberant signal component may be divided into K reverberant sub-components $\tilde{R}_{0,1}(\omega)$, $\tilde{R}_{0,2}(\omega), \ldots, \tilde{R}_{0,K}(\omega)$ as follows, $$\tilde{R}_{0,k}(\omega) = p_{1,k}(\omega)\tilde{S}_1(\omega)\tilde{H}_1(\omega) + \ldots + p_{B,k}(\omega)\tilde{S}_B(\omega)\tilde{H}_B(\omega)$$

Where $p_{i,k}(\omega)$ [i=0, . . . , B and k=1, . . . , K] are frequency-dependent gain vectors that allow the overall reverberant signal component to be selectively divided across time and frequency. Thus, portions of the reverberant signal that result from the dry signal component being convolved by specific parts of the impulse response may be selectively extracted with the Decompose Processor 33. For example, the reverberant signal component due to the early reflections 12 (FIG. 2) could be extracted separately from the components due to the reverberant tail 11 (FIG. 2). Similarly, different parts of the early reflections and/or the reverberant tail may be extracted separately. Moreover, the values of $p_{i,k}(\omega)$ may be chosen to selectively separate the low and high frequencies of different components of the reverberant signal.

The block-based impulse response may be estimated by the magnitude of the frequency domain representations of the B+1 blocks. Therefore, the above equations can be modified as follows, $$|\tilde{S}_0(\omega)|^2 = |M_0(\omega)|^2 - (|\tilde{S}_1(\omega)|^2|\tilde{H}_1(\omega)|^2 + \ldots + |\tilde{S}_B(\omega)|^2|\tilde{H}_B(\omega)|^2)$$

$$|\tilde{R}_0(\omega)|^2 = |\tilde{S}_1(\omega)|^2|\tilde{H}_1(\omega)|^2 + \ldots + |\tilde{S}_B(\omega)|^2|\tilde{H}_B(\omega)|^2$$

$$|\tilde{R}_{0,k}(\omega)|^2 = p_{1,k}(\omega)|\tilde{S}_1(\omega)|^2|\tilde{H}_1(\omega)|^2 + \ldots + p_{B,k}(\omega)|\tilde{S}_B(\omega)|^2|\tilde{H}_B(\omega)|^2$$

The phase of the input signal $M_0(\omega)$ may be used as the phase response for $\tilde{S}_0(\omega)$ as well as for $\tilde{R}_{0,1}(\omega)$, $\tilde{R}_{0,2}(\omega)$, . . . , $\tilde{R}_{0,K}(\omega)$.

The Decompose Processor 33 may be configured to apply different gain vectors to the input signal $M(\omega)$, $$\tilde{S}_0(\omega) = G_S(\omega)M_0(\omega)$$
$$R_{0,1}(\omega) = G_{R_1}(\omega)M_0(\omega)$$
$$R_{0,2}(\omega) = G_{R_2}(\omega)M_0(\omega)$$
$$\ldots$$
$$R_{0,K}(\omega) = G_{R_K}(\omega)M_0(\omega)$$

The gain vector for the dry signal component is derived by, $$G_S(\omega) = \tilde{S}_0(\omega)/M_0(\omega)$$

$$G_S(\omega) = \frac{|M_0(\omega)|^2 - \left(\left|\tilde{S}_1(\omega)\right|^2\left|\tilde{H}_1(\omega)\right|^2 + \ldots + \left|\tilde{S}_B(\omega)\right|^2\left|\tilde{H}_B(\omega)\right|^2\right)}{|M_0(\omega)|^2}$$

$$G_S(\omega) = \begin{cases} MinGain(\omega); & G_S(\omega) < MinGain(\omega) \\ G_S(\omega); & \text{otherwise} \end{cases}$$

where the frequency dependent parameter $MinGain(\omega)$ prevents $G_S(\omega)$ from falling below some desired value.

The gain vector may be a vector of real values and thus it may only affect the magnitude of $M_0(\omega)$. As a result $\tilde{S}_0(\omega)$ has the same phase response as $M_0(\omega)$. The gain vectors for the reverberant signal components may be found in similar fashion.

The values of the gain vectors $G_S(\omega)$, $G_{R_1}(\omega), \ldots, G_{R_K}(\omega)$ may be further refined by employing a Perceptual Model 47 and a Source Model 46. The Perceptual Model 47 may account for the masking properties of the human auditory system, while the Source Model 46 may account for the physical characteristics of sound sources, such as a harmonic structure of a violin. In one example, the two models may be combined and provide a smoothing of the gain vectors $G_S(\omega)$, $G_{R_1}(\omega), \ldots, G_{R_K}(\omega)$ over time and frequency. The smoothing over time is achieved as follows, $$G_{S,\tau}'(\omega) = (1-\gamma(\omega)) \cdot G_{S,\tau-1}'(\omega) + \gamma(\omega) \cdot G_{S,\tau}(\omega)$$

$$G_{R_1,\tau}'(\omega) = (1-\gamma(\omega)) \cdot G_{R_1,\tau-1}'(\omega) + \gamma(\omega) \cdot G_{R_1,\tau}(\omega)$$

$$G_{R_2,\tau}'(\omega) = (1-\gamma(\omega)) \cdot G_{R_2,\tau-1}'(\omega) + \gamma(\omega) \cdot G_{R_2,\tau}(\omega)$$

$$\ldots$$

$$G_{R_K,\tau}'(\omega) = (1-\gamma(\omega)) \cdot G_{R_K,\tau-1}'(\omega) + \gamma(\omega) \cdot G_{R_K,\tau}(\omega)$$

where τ indicates the current time frame of the process. γ(ω) determines for each frequency band the amount of smoothing that is applied to the gain vectors $G_S(\omega)$, $G_{R_1}(\omega)$, ..., $G_{R_L}(\omega)$ over time. Different values of γ(ω) can be used for each gain vector. In addition, the values of γ(ω) can vary with frequency. The values of γ(ω) may also change over time and may be dependent upon the input signal, or upon the values of the gain vectors.

The simultaneous masking properties of the human auditory system can be viewed as a form of smoothing or spreading of energy over frequency. In one example, the simultaneous masking may be computed as follows, $$Masking_S(\omega) = spread1(\omega) \cdot G'_{S,\tau}(\omega) + spread2(\omega) \cdot Masking_S(\omega - 1)$$

$$Masking_{R_1}(\omega) = spread1(\omega) \cdot G'_{R_1,\tau}(\omega) + spread2(\omega) \cdot Masking_{R_1}(\omega - 1)$$

$$Masking_{R_2}(\omega) = spread1(\omega) \cdot G'_{R_2,\tau}(\omega) + spread2(\omega) \cdot Masking_{R_2}(\omega - 1)$$

...

$$Masking_{R_K}(\omega) = spread1(\omega) \cdot G'_{R_K,\tau}(\omega) + spread2(\omega) \cdot Masking_{R_K}(\omega - 1)$$

The variables spread1(ω) and spread2(ω) determine the amount of simultaneous masking across frequency. In this example, spread1(ω) and spread2(ω) are designed to account for the fact that the bandwidths of the auditory filters increase with increasing frequency, and so more spreading may be applied at higher frequencies.

The gain vectors may be refined by adding the effects of the estimated masking. The frequency dependent parameter μ(ω) determines the level at which the masking estimate is added to the previously computed gain vector values, $$G''_{S,\tau}(\omega) = G'_{S,\tau}(\omega) + \mu(\omega) \cdot Masking_S(\omega)$$

$$G''_{R_1,\tau}(\omega) = G'_{R_1,\tau}(\omega) + \mu(\omega) \cdot Masking_{R_1}(\omega)$$

$$G''_{R_2,\tau}(\omega) = G'_{R_2,\tau}(\omega) + \mu(\omega) \cdot Masking_{R_2}(\omega)$$

...

$$G''_{R_K,\tau}(\omega) = G'_{R_K,\tau}(\omega) + \mu(\omega) \cdot Masking_{R_K}(\omega)$$

This step can cause the gain vector values to exceed 1.0. In this example, the maximum gain values are limited to 1.0, although other limits are possible in other examples, $$G''_{S,\tau}(\omega) = \begin{cases} 1.0; & G''_{S,\tau}(\omega) > 1.0 \\ G''_{S,\tau}(\omega); & \text{otherwise} \end{cases}$$

Similar operations may be performed for the remaining gain vectors. These final gain vectors are applied to the input signal M(ω) by the Decompose Processor 33 to produce the dry signal component 34 and the reverberant signal components 35. The dry signal component 34 may be modified by the Dry Signal Modifier 36 if desired. Modifications may include, but are not limited to level adjustments, frequency filtering, and dynamic range processing. The reverberant signal components 35 may be modified by the Reverberant Signal Modifier 37. Modifications may include, but are not limited to level adjustments, frequency filtering, and dynamic range processing. Neither the Dry Signal Modifier 36 nor the Reverberant Signal Modifier 37 may change the reverberant content of the dry signal component 34 or the reverberant signal components 35.

$$\tilde{S}'(\omega) = Modify[\tilde{S}(\omega)]$$

$$R'_1(\omega) = Modify[R_1(\omega)]$$

$$R'_2(\omega) = Modify[R_2(\omega)]$$

...

$$R'_K(\omega) = Modify[R_K(\omega)]$$

Figure 7:
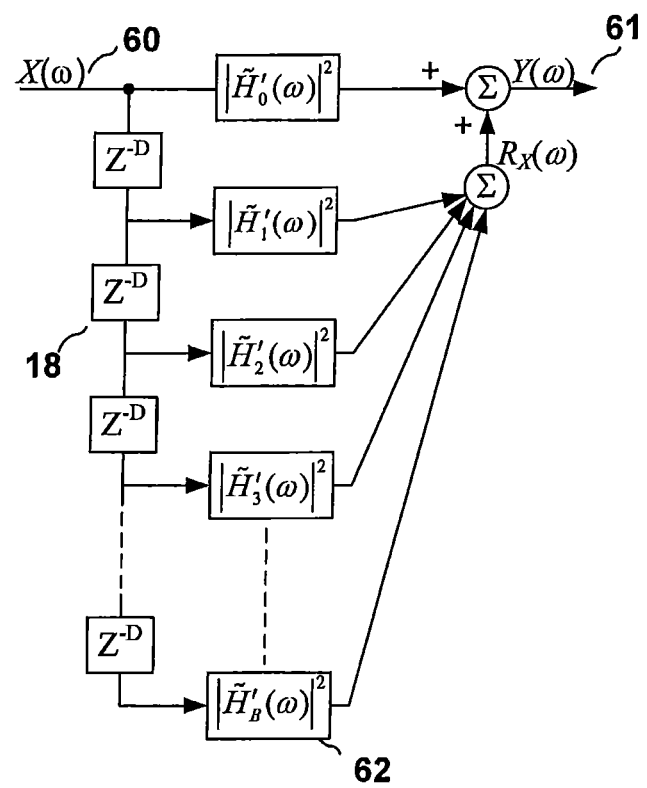
FIG. 7 depicts the frequency domain block-based convolution operation of a Recompose Processor module included in the audio signal processing system.

In FIG. 3, the Recompose Processor 38 may combine the modified (or not) dry signal component estimate $\tilde{S}'(\omega)$, and the modified (or not) estimates of the reverberant signal subcomponents $R_1'(\omega)$, $R_2'(\omega)$, ..., $R_K'(\omega)$ to produce one or more reverberation-adjusted frequency spectra 27. Another operation performed by the Recompose Processor 38 is to apply a block-based impulse response to a signal X(ω) 60 to produce an output signal Y(ω) 61 as depicted in FIG. 7. The block-based impulse response may consist of either the original $|\tilde{H}_i'(\omega)|^2$ derived by the Impulse Response Estimator 24, or a modified version $|\tilde{H}_i'(\omega)|^2$ 62. The input signal X(ω) to this process may consist of one or more of $\tilde{S}'(\omega)$, $\tilde{R}_1'(\omega)$, $\tilde{R}_2'(\omega)$, ..., $\tilde{R}_K'(\omega)$, or a secondary input signal $S_2(\omega)$. Different versions of $|\tilde{H}_i'(\omega)|^2$ may be used for different input signals. The output signals from this block-based convolution process may provide additional reverberation-adjusted frequency spectra 27. The Recompose Processor 38 includes a Source Model 48 and a Perceptual Model 49. In one example, the Source Model 48 and the Perceptual Model 49 may be combined with the Source Model 46 and Perceptual Model 47 of the Decompose Processor 33. In another example, the Models may be separate.

The unprocessed input signal M(ω) 25 and the reverberation-adjusted frequency spectra 27 are provided to the Signal Modifier 28. The Signal Modifier 28 may produce the final L output frequency spectra $Z_1(\omega)$, $Z_2(\omega)$, ..., $Z_L(\omega)$, which are converted to the time domain to obtain the desired output signals $z_1(t)$, $z_2(t)$, ..., $z_L(t)$ 32 that are capable of driving loudspeakers. In one example, the frequency-to-time domain converter 30 consists of a fast implementation of the Inverse Discrete Fourier Transform (IDFT) followed by windowing function 31, such as a root-Hanning window.

For applications where the invention is used to create a monophonic output signal (i.e., L=1), the Signal Modifier 28 may operate on the reverberation-adjusted spectra 27 to combine them to create a modified version of the input signal with modified reverberant characteristics.

For applications where the audio signal processing system 10 creates additional audio channels from a monophonic input signal, the operation of the Signal Modifier 28 includes operating on the reverberation-adjusted frequency spectra 27 to combine them to create two or more unique output frequency spectra $Z_1(\omega)$, $Z_2(\omega)$, ..., $Z_L(\omega)$ 29.

In some applications there is no need for the Signal Modifier 28 to modify either the unprocessed input signal M(ω) 25 or the reverberation-adjusted frequency spectra 27, and so the Signal Modifier 28 may simply pass these signals to the final output frequency spectra $Z_1(\omega)$, $Z_2(\omega)$, ..., $Z_L(\omega)$.

As previously discussed, the audio signal processing system 10 may operate with a suitable block-based estimate of the impulse response of the reverberant system. The Impulse Response Estimator 24 may operate on the frequency-domain representation of the input signal M(ω) 25 to produce the block-based estimates $H_0(\omega)$, $H_1(\omega)$, ..., $H_B(\omega)$ 23 of the impulse response.

Two factors combine to determine the rate at which a reverberant input signal M(ω) 25 decays (or grows) at a given frequency. The first factor is the rate of decay (or growth) of the dry sound source s(t), and the second is the rate of decay of the reverberant system. While the rate of decay of the reverberant system (e.g. a concert hall) at a given frequency may be relatively constant over time, the rate of decay of the dry sound source may vary continuously. Using the example of a singer, the level of the singer's voice at a given frequency rises and drops continuously over time. Therefore, the fastest rate of decay of the input signal M(ω) 25 occurs when the dry sound source s(t) stops at a given frequency, and the decay in the signal is due to the decay of the reverberant system.

In one example, at a given predetermined frequency, the best opportunity to estimate $|\tilde{H}_i(\omega)|^2$ is when the dry sound source s(t) 1 has just stopped at the predetermined frequency. At that point what follows is the reverberant component r(t) of the signal, and the decay of the reverberant system can be observed. From this information, an estimate $|\tilde{H}_i(\omega)|^2$ can be obtained by observing the ratio of the magnitude of the current block $|M_0(\omega)|^2$ to that of a previous block $\oplus M_i(\omega)|^2$, and estimating the minimum value of this ratio.

$$|C_i(\omega)|^2 = \begin{cases} \frac{|M_0(\omega)|^2}{|M_i(\omega)|^2}; & \frac{|M_0(\omega)|^2}{|M_i(\omega)|^2} < |\tilde{H}_i(\omega)|^2 \\ |\tilde{H}_i(\omega)|^2 \cdot \text{Bias}_i(\omega) + \varepsilon; & \text{otherwise} \end{cases} \quad i = 1, \ldots, B$$

where $\text{Bias}_i(\omega)$ is a predetermined value greater than 1.0 and ε is a predetermined relatively small value. The frequency dependent parameter $\text{Bias}_i(\omega)$ may prevent $|C_i(\omega)|^2$ from being trapped at an incorrect minimum value, while ε may prevent $|C_i(\omega)|^2$ from being trapped at a value of zero. The minimum of the above ratio corresponds to the fastest rate of decay of the signal at that frequency, and therefore corresponds to an estimate of $|\tilde{H}_i(\omega)|^2$ at that frequency. This process may be performed at each frequency w for all blocks [i=1, . . . , B].

In this example the Source Model 43 may be implemented as follows, $$|C_i(\omega)|^2 = \begin{cases} \text{MaxValue}_i(\omega); & |C_i(\omega)|^2 > \text{MaxValue}_i(\omega) \\ |C_i(\omega)|^2; & \text{otherwise} \end{cases} \quad i = 1, \ldots, B$$

The parameter $\text{MaxValue}_i(\omega)$ may prevent $|C_i(\omega)|^2$ and thus $|\tilde{H}_i(\omega)|^2$ from exceeding a predetermined value that would not be expected in real acoustic spaces. $\text{MaxValue}_i(\omega)$ can vary over frequency and across blocks. A temporal smoothing operation based on the Source Model 46 or 48 may be applied to provide a more stable estimate of $|\tilde{H}_i(\omega)|^2$.

$$|\tilde{H}_{i,\tau}(\omega)|^2 = \alpha_i(\omega)|\tilde{H}_{i,\tau-1}(\omega)|^2 + (1-\alpha_i(\omega))|C_i(\omega)|^2$$

Where τ indicates the current time frame of the process, and $\alpha_i(\omega)$ is a frequency dependent parameter that controls the amount of temporal smoothing. $\alpha_i(\omega)$ may also vary over time and across blocks, and its value may be dependent upon the current block of the input signal as well as previous blocks of the input signal.

In this example, smoothing of $|\tilde{H}_i(\omega)|^2$ over frequency is performed as part of the Source Model 43. The amount of smoothing may be determined by the value of $\beta_i(\omega)$. $\beta_i(\omega)$ can vary over frequency and across blocks.

$$|\tilde{H}_i'(\omega)|^2 = \beta_i(\omega)|\tilde{H}_i(\omega)|^2 + \frac{1-\beta_i(\omega)}{2}(|\tilde{H}_i(\omega-1)|^2 + |\tilde{H}_i(\omega+1)|^2)$$

The final estimates $|\tilde{H}_i'(\omega)|^2$ [i=1, . . . , B], of the block-based impulse response may be employed to derive the gain vectors that are used to derive the estimate of the dry signal component, as well as the estimates of the reverberant signal components.

In order to reduce computational and storage requirements, the Impulse Response Estimator 24 can also consist of an adaptive parametric model of the frequency-domain representation of an impulse response. As one example, the reverberant system may be modeled as a simple exponentially decaying system, where the rate of decay varies with frequency. In this case, one adaptive parameter will account for the rate at which the exponential system decays. The rate of decay will be different for different frequencies. Typically, in an acoustic space, the higher frequencies decay more quickly than the lower frequencies. Therefore, another parameter may account for the varying rates of decay across frequencies. Another parameter may account for the level of the reverberant energy with respect to the energy in the dry signal component. The parameters may be adapted over time in order to obtain the best estimate of the actual impulse response of the reverberant system. It is also possible for the Impulse Response Estimator 24 to hold one or more of the parameters fixed rather than have them be adaptive. In other examples, other parametric models are possible.

As previously discussed, the audio signal processing system 10 can also operate on stereo and multichannel input signals. When the input signal has more than one channel, the audio signal processing system 10 can either operate on each channel independently, or the operations on the channels may be combined and information regarding a given channel may be used in the processing of the other channels.

In FIG. 2, the B+1 blocks 15, 16 of the impulse response do not need to be of equal size. For example, it may be desirable to use shorter blocks to represent the initial part of the impulse response in order to obtain better temporal resolution for the early reflection portion 12 of the impulse response.

The B+1 blocks 15 of the impulse response may overlap, or they may not have any overlap as depicted in FIG. 2. In the case where the blocks overlap, a window function may be used to provide a smooth transition from block to block. In one example, the blocks have a 50% overlap.

In one example the magnitude-squared $|f|^2$ of the frequency domain representation of the signals and impulse response may be used in the processing, where f represents some arbitrary value. In other examples, any other power of magnitude $|f|^q$ can be used. Therefore, with q=2, the magnitude of the value of f is raised to the power 2 (i.e. the magnitude-squared of f).

For applications where reverberation is being added to a second input signal $s_2(t)$ 40, the Recompose Processor 38 may include a block-based frequency domain FIR filter structure as depicted in FIG. 7. The filters may consist of modified estimates of the magnitudes of the impulse response blocks $\tilde{H}_1'(\omega), \tilde{H}_1'(\omega), \ldots, \tilde{H}_B'(\omega)$. In one example, the Recompose Processor 38 filters may be implemented with the Recompose Processor 38 by applying gain vectors to the input signal.

In one example, the Decompose Processor 33 and the Recompose Processor 38 operate independently of each other. In other examples, aspects of the Decompose Processor 33 and the Recompose Processor 38 may be combined.

The audio signal processing system 10 is configured to create additional audio channels based on the input signal $M(\omega)$ 25. That is, the audio signal processing system 10 is configured to create V output channels from an input signal $M(\omega)$ 25 having U channels, where V>U. Examples of this include creating a stereo or multichannel signal from a monophonic input signal; creating a multichannel signal from a stereo input signal; and creating additional channels from a multichannel input signal. In general, the audio signal processing system 10 may provide more output audio channels than were present in the received input audio channel(s) by extracting and decomposing the reverberant component of the input signal into different subcomponents $R_1(\omega)$, $R_2(\omega)$, ..., $R_K(\omega)$ 35, and distributing them to different output channels. A given subcomponent of the reverberant signal may be assigned to more than one output channel. The created channels may also include the estimate of the dry signal component $\tilde{S}(\omega)$ 34 and the input signal $M(\omega)$ 25.

The Decompose Processor 33 may be configured to employ the block-based estimate of the impulse response $\tilde{H}_0(\omega), \tilde{H}_1(\omega), \ldots, \tilde{H}_B(\omega)$ to operate on the input signal $M(\omega)$ 25 to derive a perceptually suitable set of reverberant subcomponents. The Recompose Processor 38 may be configured to operate on the estimate of the dry signal $\tilde{S}(\omega)$ 34 and the reverberant subcomponents 35 to derive a set of reverberation-adjusted frequency spectra 27. In some examples the Signal Modifier 28 may assign the reverberation-adjusted frequency spectra directly to the final V output frequency spectra $Z_1(\omega), Z_2(\omega), \ldots, Z_V(\omega)$ 29. The final output frequency spectra may be converted to the time domain 30, and windowed 31 to provide the multichannel audio signal consisting of $z_1(t), z_2(t), \ldots, z_V(t)$ 32 to drive a set of V loudspeakers.

In other examples, the Signal Modifier 28 may selectively combine two or more of the reverberation-adjusted frequency spectra 27 to create the V output frequency spectra. The Signal Modifier 28 may also include the unprocessed input signal $M(\omega)$ 25 in one or more of the V output frequency spectra.

Figure 8:
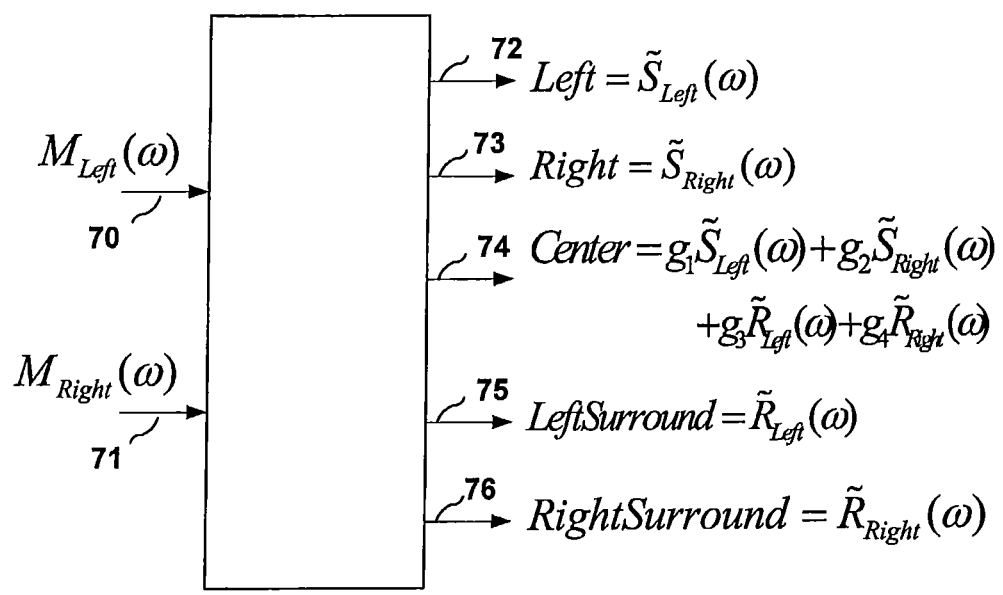
FIG. 8 depicts an example of the audio signal processing system creating a multichannel output signal from a stereo input signal.

FIG. 8 illustrates an example approach to creation of a five-channel (V=5) output signal from a stereo input signal (U=2). The Left input signal $M_{Left}(\omega)$ 70 may be decomposed into its direct signal component $\tilde{S}_{Left}(\omega)$ and reverberant signal component $\tilde{R}_{Left}(\omega)$. The Left-channel direct signal component $\tilde{S}_{Left}(\omega)$ may be sent to the Left output channel 72, while the Left-channel reverberant signal component) $\tilde{R}_{Left}(\omega)$ may be sent to the Left-Surround output channel 75. Similarly, the Right input signal $M_{Right}(\omega)$ 71 may be decomposed, and the Right-channel direct signal component $\tilde{S}_{Right}(\omega)$ may be sent to the Right output channel 73, while the Right-channel reverberant signal component $\tilde{R}_{Right}(\omega)$ may be sent to the Right-Surround output channel 74. The Center output channel 74 may be made up of some mixture of $g_1\tilde{S}_{Left}(\omega)+g_2\tilde{S}_{Right}(\omega)+g_3\tilde{R}_{Left}(\omega)+g_4\tilde{R}_{Right}(\omega)$ where $g_1, g_2, g_3$ and $g_4$ determine the relative level at which the components are mixed together. This example is simply one of the virtually unlimited approaches by which the audio signal processing system 10 can decompose the input signal to create additional audio channels.

In one example, the impulse response h(t) may be approximated by an FIR filter. As a result, the Decompose Processor 33 may employ a block-based infinite impulse response (IIR) filter structure and the Recompose Processor 36 may employ a block-based finite impulse response (FIR) structure. Alternatively, the impulse response h(t) could be approximated by an IIR filter. In this case, the Decompose Processor 33 may employ a block-based FIR filter structure similar to that shown in FIG. 5 and the Recompose Processor may employ a block-based IIR filter structure similar to that shown in FIG. 6. The block-based frequency domain processing could therefore be given as, $$M(\omega)=S(\omega)H_0(\omega)+M(\omega)z^{-D}H_1(\omega)+\ldots+M(\omega)z^{-BD}H_B(\omega)$$

and $$\tilde{S}_0(\omega) = \frac{M_0(\omega) - (M_1(\omega)\tilde{H}_1(\omega) + \ldots + M_B(\omega)\tilde{H}_B(\omega))}{\tilde{H}_0(\omega)}$$

where $\tilde{S}_i(\omega)$ is an estimate of the true value of $S_i(\omega)$ and $\tilde{H}_0(\omega)$ is assumed to equal 1. The corresponding block-based estimates $\tilde{H}_0(\omega), \tilde{H}_1(\omega), \ldots, \tilde{H}_B(\omega)$ of the impulse response may be obtained by estimating the minimum values of the ratios of the magnitude of the current block $|M_0(\omega)|^2$ to those of previous blocks $|M_i(\omega)|^2$.

Additional audio channels may be created with the audio signal processing system 10 in order to alter the perceived acoustics of a playback room.

Figure 9:
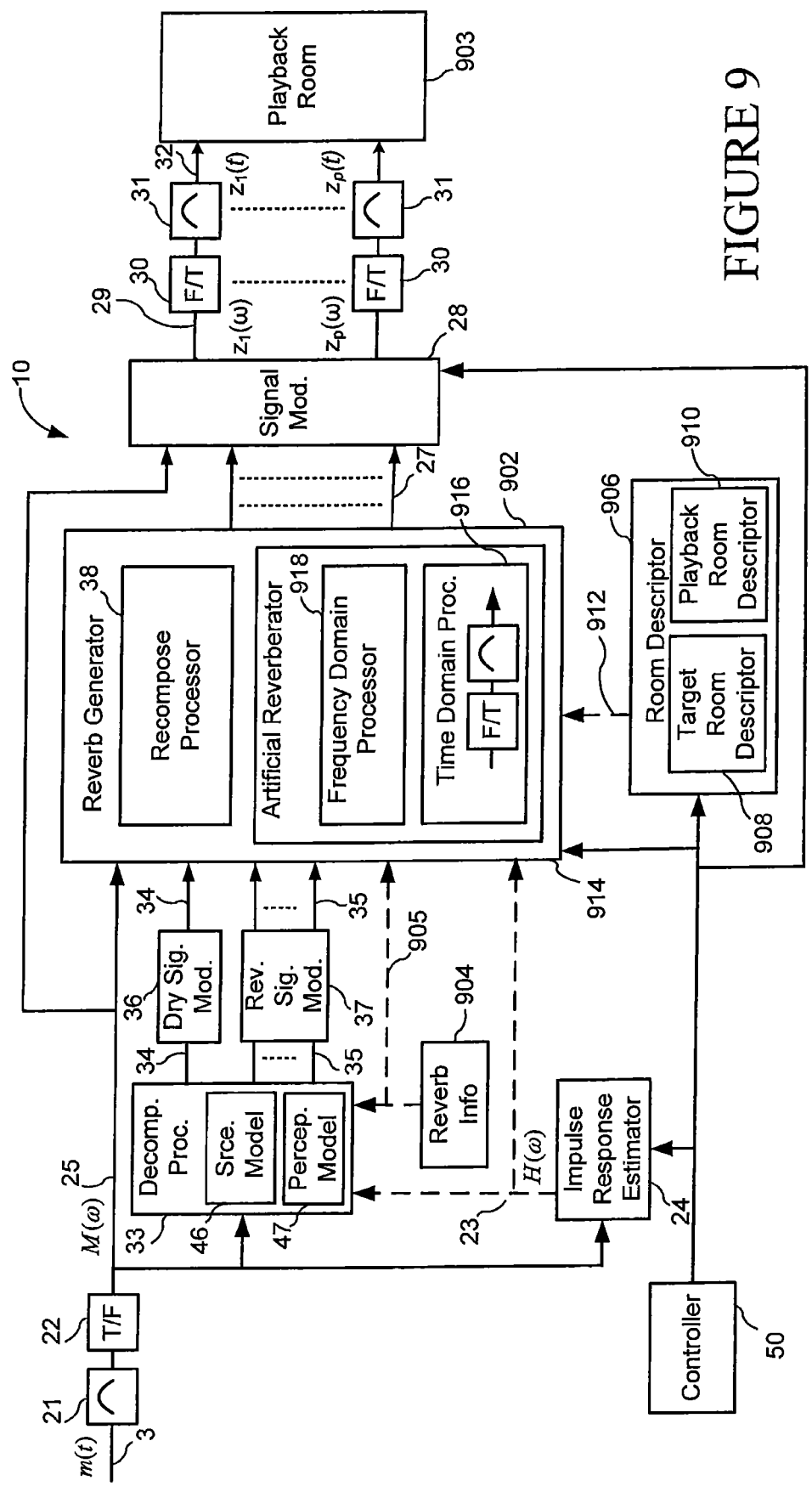
FIG. 9 depicts a schematic diagram of functionality of the example signal processor included in the audio signal processing system of FIG. 1.

FIG. 9 depicts another example of the audio signal processing system 10. For purposes of brevity, the following discussion will focus mainly on those parts of the audio signal processing system 10 that are different from the previously described system. Moreover, some of the previously discussed components are shown in less detail in FIG. 9, but may still include all of the previously discussed functionality.

During operation, an unprocessed input signal $M(\omega)$ 25 may be operated upon by the Decompose Processor 33 to produce estimates of the dry signal component 34 and the reverberant signal components 35, as previously discussed. The Dry Signal Modifier 36 and the Reverberant Signal Modifier 37 may selectively operate on the dry and reverberant signal components, respectively.

In FIG. 9, the audio signal processing system 10 includes a module comprising instructions stored in memory that is a Reverb Generator 902. The Reverb Generator 902 may operate on the dry signal component 34 and the reverberant signal components 35 to produce one or more reverberation-adjusted frequency spectra 27. The signal modifier 28 may modify and mix frequency components of the reverberation-adjusted frequency spectra 27 as well as the input signal $M(\omega)$ 25 to produce one or more output frequency spectra $Z_1(\omega), Z_2(\omega), \ldots, Z_L(\omega)$ 29. The frequency-to-time domain processors 30 may produce output frames of time samples $z_1(t), z_2(t), \ldots, z_L(t)$ as output signals 32 in response to the output frequency spectra. These output signals 32 may be provided to an amplification device, and eventually routed to loudspeakers distributed within a playback room 903.

The reverberation adjusted frequency spectra 27 may be generated in order to alter the perceived acoustic characteristics of the playback room. An example of the perceived acoustic characteristics is the perceived size, or distance to boundaries of an acoustic space. In one example, the loudspeakers may include loudspeakers located above the listener, such as in the ceiling of the playback room, as well as loudspeakers located below the elevation of a listener's ears. One or more loudspeakers located above the listener may be driven to alter the perceptual height of the acoustic space by altering the perceptual distance between the listener and the sound source. For example, an interior roof of a vehicle may be perceptual adjusted to be much higher above the head of passengers in the vehicle by altering the sound output by the loudspeakers above the listener to be perceived as further away. Loudspeakers located below the elevation of the listener's ears may be driven to alter a perceptual distance to bottom, base or ground boundary walls of an acoustic space. For example, the interior floor of a vehicle may be physically close to passengers in the vehicle, however audio signals output by the loudspeakers may be perceptual much further away from the passengers.

Overhead loudspeakers may be used to simulate an early reflection of a sound wave due to the ceiling of an acoustic space. In an actual acoustic space, such as a room the level and time-of-arrival (after the direct sound) of a ceiling reflected sound wave provides perceptual cues to a listener regarding the height of the ceiling. In general, a longer delay between the direct sound and the ceiling reflection indicates a higher ceiling, while a shorter delay indicates a lower ceiling. The Reverb Generator 902 may modify a perceived height of a ceiling of an acoustic space by separately adjusting the delays of the early reflections of the reverberation signal component 35 that are routed to overhead loudspeakers prior to combining the dry audio signal component 34 with the reverberation signal component 35.

A higher level overhead reflection (with respect to the level of the direct sound) can generally indicate a lower ceiling, whereas the level of an overhead reflection due to a higher ceiling will generally be lower compared to the level of the direct sound. The Reverb Generator 902 may therefore also modify a perceived height of the ceiling by adjusting the levels of early reflections included in the reverberation signal component 35 that are routed to overhead loudspeakers prior to combining the dry audio signal component 34 with the reverberation signal component 35.

Loudspeakers positioned below a listener's ears may be used to simulate an early reflection due to the floor of an acoustic space. In actual acoustic spaces, such as a room, the level and time-of-arrival (after the direct sound) of a floor reflection provides perceptual cues to a listener regarding the height of a sound source above the floor. In general, a longer delay between the direct sound and the floor reflection indicates that the sound source is higher above the floor, while a shorter delay indicates that the sound source is closer to the floor. The Reverb Generator 902 may modify a perceived height of the sound source by adjusting the delays of early reflections included in the reverberation signal component 35 that are routed to loudspeakers positioned below a listener's ears prior to combining the dry audio signal component 34 with the reverberation signal component 35.

A higher level floor reflection (with respect to the level of the direct sound) can generally indicate a lower sound source, for example closer to a floor, whereas the level of a floor reflection due to a higher sound, for example further from the floor, will generally be lower compared to the level of the direct sound. The Reverb Generator 902 may therefore also modify a perceived height of a sound source by adjusting the levels of early reflections included in the reverberation signal component 35 that are routed to loudspeakers positioned below a listener's ears prior to combining the dry audio signal component 34 with the reverberation signal component 35.

Another example perceived acoustic space characteristic is related to sound reflective properties in an acoustic space. The Reverb Generator 902 may further reinforce the perceptual effects of the reflections arriving from overhead and below the listener's ears by filtering the reflections included in the reverberation signal component 35 in order to alter the frequency responses of the combination of the dry signal component 34 and the filtered reverberation signal component 35. This can be done to better mimic what happens in an acoustic space such as an actual room, where the various surfaces in the acoustic space have different frequency-dependent reflective properties. For example, a carpet does not reflect higher frequencies as strongly as lower frequencies. The frequency filtering can operate to simulate this effect.

Yet another example perceived acoustic space characteristic is related to intelligibility. Early reflections arriving from overhead or below a listener's ears can help to substantially improve speech intelligibility as compared to similar early reflections arriving from the side of the listener. With early reflections arriving above or below the listener's ear, the listener receives substantially similar signals at his two ears. Therefore, the correlation between the signals at the two ears is increased. Conversely, early reflections arriving from the side of the listener tend to reduce the correlation between the signals at the two ears. In some situations, increased correlation between the signals at the two ears can increase speech intelligibility.

Another use for both the overhead loudspeakers and the loudspeakers below the listener's ears is to provide reverberant energy (reverberant tail) in addition to the reverberant energy provided by the other loudspeakers. Reverberant energy arriving from above and below the listener's ears can further immerse the listener in a diffuse reverberant sound field and is another example of an acoustic space characteristic. This acoustic space characteristic can enhance the listener's sense of realism and the increased diffusiveness of the reverberant sound tends to reduce the perception of the boundaries of the room. The audio signal processing system 10 can adjust the reverberant energy accordingly to obtain desired acoustic space characteristics related to a listener's sense of realism and increased diffusiveness. Therefore, in a relatively small acoustic space, such as the passenger cabin of a vehicle, the increased diffusiveness of the reverberant sound can help to provide the perception that there is sound energy emanating from beyond the boundaries of the passenger cabin.

During operation, the Impulse Response Estimator 24 may form a block-based estimate of the impulse response $\tilde{H}(\omega)$ 23 based on reverberation in the input signal $M(\omega)$ 25. In addition, the Decompose Processor 33 may use the block-based estimate of the impulse response $\tilde{H}(\omega)$ 23 to decompose the input signal into the dry signal component 34 and the reverberant signal component 35. As previously discussed, as used herein, the terms "reverberant signal component" refers to one or more reverberant signal components. The Reverb Generator 902 may use the block-based estimate of the impulse response $\tilde{H}(\omega)$ 23 to adjust parameters of the Reverb Generator 902 so that the reverberation created by the Reverb Generator 902 matches or complements the reverberation component found in the input signal $M(\omega)$ 25.

The audio signal processing system 10 also includes a module stored in the memory that is a Reverb Info module 904. The Reverb Info module 904 is configured to receive, store in memory, and retrieve reverb data regarding the reverberant system or acoustic space used to create the unprocessed input signal m(t) 3. The reverb data received with the Reverb Info module 904 may be provided separately from the unprocessed audio input signal m(t) 3. For example, the reverb data may be stored in a separate database that is accessed by the Reverb Info module 904 based on radio data system (RDS data), metadata, or any other uniquely identifying data associated with the audio source information of the unprocessed input signal m(t) 3. Alternatively, the reverb data may be provided as header information contained within the unprocessed audio input signal m(t) 3.

The reverb data received by the Reverb Info module 904 may include information relating to the audio input signal, such as the impulse response of the reverberant system in the source room. In addition, the reverb info may include the settings of a Reverb Generator used in creating the audio input signal m(t) 3. Further, the reverb data may consist of objective acoustical parameters, such as reverberation time and early-to-late energy ratios. These parameters may vary with frequency. The acoustical parameters may also include indicators of room size and room type.

The Reverb Info module 904 may also receive a pre-determined block-based estimate of the impulse response $\tilde{H}(\omega)$ based on the input signal $M(\omega)$ 25. The block-based estimate of the impulse response $\tilde{H}(\omega)$ may be provided by the Reverb Info module 904 to the Decompose Processor 33 as reverb information 905. Thus, information from the Reverb Info module 904 may be provided to the Decompose Processor 33 in addition to, or instead of the information provided from the Impulse Response Estimator 24. In addition, the Reverb Info module 904 may provide the block-based estimate of the impulse response $\tilde{H}(\omega)$ 23 to the Reverb Generator 902 as the reverb information 905. The Reverb Generator 902 may use the block-based estimate of the impulse response $\tilde{H}(\omega)$ 23 to adjust its parameters so that the reverberation created by the Reverb Generator 902 matches or complements the reverberation component found in the input signal $M(\omega)$ 25. Accordingly, the reverb information 905 may be an alternative to the information provided by the Impulse Response Estimator 24.

The audio signal processing system 10 may also include a module stored in the memory that is a Room Descriptor 906. The Room Descriptor 906 may include a Target Room Descriptor 908 and a Playback Room Descriptor 910 stored in memory. During operation, the Room Descriptor 908 may provide room descriptor information 912 to the Reverb Generator 902 regarding one or both of the Target Room Descriptor 908 and the Playback Room Descriptor 910. In other examples, the Room Descriptor may be omitted.

The Target Room Descriptor 908 may include target data representing acoustical characteristics of one or more target rooms. The terms "target room" as used herein refers to acoustical characteristics of an acoustic space that are synthesized with the audio signal processing system 10 in a playback room, such that the playback room takes on the acoustical characteristics of the target room. That is, the audio signal processing system 10 may use the acoustical characteristics of the target acoustic space(s) to make the playback room perceptually sound like the target room to a listener positioned in the playback room listening to loudspeakers being driven by the processed input audio signal. The Playback Room Descriptor 910 may include playback data regarding the acoustical characteristics of the playback room where the loudspeakers are operating.

The audio signal processing system 10 may modify the input audio signal in order for a playback room to take on, or synthesize, the acoustical characteristics of a target room. Modification of the input audio signal by the audio signal processing system 10 is such that "corruption" by the acoustical characteristics of the playback room is avoided. The acoustical characteristics of the playback room could otherwise be superimposed upon those of the target room since the sound waves emitted by the loudspeakers in the playback room are naturally altered by the acoustics of the playback room.

The audio signal processing system 10 may use the playback data of the Playback Room Descriptor 910 to alter the processing of the Reverb Generator 38 such that the acoustic affects of the playback room are reduced. Therefore, the Room Descriptor 906 is configured to alter the target data with the playback data to account for the Playback Room Descriptor 910. The altered target data may be provided to the Reverb Generator 902 by the Room Descriptor 906 as the room descriptor information 912.

Thus, the Room Descriptor 906 may selectively choose target data and modify the target data with playback data based on the playback room. Selection of the target data and the playback data may be based on a user selection, the audio source material, or any other parameter related to playback of the audio input signal in an acoustic space through loudspeakers. In other examples, the Room Descriptor 906 may select target data from the Target Room Descriptor 908 and the use of playback data from the Playback Room Descriptor 910 may be omitted from the room descriptor information 912.

The target data included in the Target Room Descriptor 908 and the playback data included in the Playback Room Descriptor 910 may include one or more impulse responses $h_{target}(t)$ and $h_{playback}(t)$ measured in one or more target rooms and playback rooms, respectively. The target data and playback data may also include frequency domain representations $H_{target}(\omega)$ and $H_{playback}(\omega)$ of impulse responses measured in the respective rooms. Alternatively, or in addition, the Target Room Descriptor 908 and the Playback Room Descriptor 910 may include block-based impulse response magnitude estimates $|H_{target}(\omega)|^2$ and $|H_{playback}(\omega)|^2$ of the target room and the playback room, respectively. Alternatively, either or both of the Target Room Descriptor 908 and the Playback Room Descriptor 910 may consist of objective acoustical parameters such as reverberation time and early-to-late energy ratios. These parameters may vary with frequency. The acoustical parameters may also include indicators of room size and room type. The Controller 50 may allow a listener to adjust the parameters of the Reverb Generator 902 and the Room Descriptor 906 via the user interface 8 (FIG. 1) in order to alter the perceived characteristics of the playback room as desired.

In another example, the Reverb Info module 904 and/or the Room Descriptor 906 may include pre-determined equalization data. The Reverb Generator 902 may use the predetermined equalization data to determine frequency filtering based on parameters of the Playback Room Descriptor 910 and/or the Target Room Descriptor 908 that are descriptive of various surfaces in the acoustic spaces having different frequency-dependent reflective properties. For example, a carpet does not reflect higher frequencies as strongly as lower frequencies. Thus, the Reverb Generator 902 may perform frequency filtering to simulate this effect based on the predetermined equalization data provided with the Playback Room Descriptor 910 and/or the Target Room Descriptor 908.

The Reverb Info module 904 may alternatively or in addition include predetermined equalization data that instructs the Reverb Generator 902 to apply specific frequency filtering. The predetermined equalization data may be applied separately and independently to the dry signal component 34 and the reverberation signal component 35 with the Reverb Generator 902. Alternatively, the predetermined equalization data could be provided to the Dry Signal Modifier 36 and the Reverberant Signal Modifier 37 to separately and independently adjust the equalization of the dry signal component 34 and the reverberation signal component 35, respectively.

The Reverb Generator 902 may include the Recompose Processor 38, operating as previously described. The Reverb Generator 902 may also include an Artificial Reverberator 914. The Artificial Reverberator 914 may be configured to perform a convolution based process wherein the input audio signal is convolved by one or more impulse responses. The impulse responses may represent the target acoustical space that is being modeled. The convolution process may be performed in the time domain with a time domain processor 916 or in the frequency domain with a frequency domain processor 918.

In one example, the Artificial Reverberator 914 may include a combination of comb filters, allpass filters, and/or FIR filters that cooperatively operate to create an artificial reverberant system. In this case, the Artificial Reverberator 914 operates in the time domain and therefore the dry signal component 34 and reverberant signal components 35 are first converted to the time domain with the time domain processor 916. In another example, where the Artificial Reverberator 914 operates in the frequency domain.

The Reverb Generator 902 may operate in a first mode using the Recompose Processor 38 or a second mode using the Artificial Reverberator 914 to generate the reverberation-adjusted frequency spectra 27. In the first mode, where the Recompose Processor 38 is used, the modified (or not) dry signal component 34 of the audio input signal may be combined with the modified (or not) reverberant signal components 35 of the audio input signal, as previously discussed. Alternatively, in the second mode where the Artificial Reverberator 914 is used, the modified (or not) dry signal component 34 of the audio input signal may be combined with an artificial reverberant signal component generated with the Artificial Reverberator 914.

Generation of the artificial reverberant signal may be based on information provided by the Room Descriptor 906. The information provided from the Room Descriptor 906 may allow the Reverb Generator 902 to account for the target room and (if available) the playback room. For example, impulse responses and/or objective acoustical parameters representative of the playback room and/or the target room may be provided from the Room Descriptor 906 as the room descriptor information 912. In addition, or alternatively, generation of the artificial reverberant signal with the Reverb Generator 902 may be based on information provided by the Reverb Info module 904 or information provided by the Impulse Response Estimator 24. For example, from a block-based estimate of the impulse response provided from either the Impulse Response Estimator 24 or the Reverb Info module 904, the Reverb Generator 902 may estimate the reverberation time (vs frequency). Based on the estimated reverberation time information, the Artificial Reverberator 914 may create signals having the estimated reverberation time.

If, on the other hand, the Reverb Generator 902 is operating in the first mode employing the Recompose Processor 38, the Reverb Generator 902 may receive block-based magnitude estimates of the impulse response $\hat{H}(\omega)$ of the playback room and/or the target room from the Room Descriptor 906 as the room descriptor information 912 in order to modify the reverberant signal component 35. In addition, or alternatively, modification of reverberant signal component 35 with the Reverb Generator 902 may be based on information provided by the Reverb Info module 904 or, as previously discussed, information provided by the Impulse Response Estimator 24. For example, from a block-based estimate of the impulse response provided from either the Impulse Response Estimator 24 or the Reverb Info module 904, the Reverb Generator 902 may estimate the reverberation time (vs frequency). Based on the estimated reverberation time information, the reverberation signal component 35 may be modified to have similar estimated reverberation time.

Selection of the first mode that uses the modified (or not) reverberant signal component 35, or the second mode that uses the artificial reverberant component may be based on a number of different selector modes. In a first selector mode, which is a manual mode, a user input such as a signal from a button, switch, or screen selection from the user interface 8 (FIG. 1) may instruct the Reverb Generator 902 to combine the dry source signal with either the modified (or not) reverberant signal component 35, or the artificial reverberant component.

In a second selector mode that is a pre-selected mode, use of the modified (or not) reverberant component 35, or the artificial reverberant component may be based on a selector setting stored in the memory 7. In a third selector mode, the instruction to select either the modified (or not) reverberant component 35, or the artificial reverberant component may be provided with the audio source material, from the Reverb Info module 904 the acoustic space in which the audio signal processing system 10 is operating, such as a vehicle, or any other external source.

In a fourth selector mode, selection of the modified (or not) reverberant component 35, or the artificial reverberant component may be dynamically performed by the Reverb Generator 902 based on predetermined conditions. For example, the Reverb Generator 902 may analyze the target room descriptor and the estimate of the impulse response of the input signal provided by the Impulse Response Estimator 24. If the target room descriptor and the estimated impulse response are different to a predetermined degree, the Reverb Generator 902 may select the artificial reverberant component. In another example, the Reverb Generator 902 may analyze and compare parameters such as reverberation time v. frequency and/or early-to-late energy ratio v. frequency from the estimated impulse response and an impulse response in the Reverb Info module 904 or the Room Descriptor 906 in order to make the selection.

In FIG. 9, in an alternative example, the Decompose Processor 33 may be bypassed and the input signal $M(\omega)$ 25 may be provided directly to the Reverb Generator 902. In this example, reverberation added by the Reverb Generator 902 in either mode 1 or mode 2 will be combined with the existing reverberation in the input signal $M(\omega)$ 25. Such added reverberation may be developed with the Reverb Generator 902 from the modified (or not) reverberation component 35 of the input signal $M(\omega)$ 25, or from artificial reverberation generated with the Artificial Reverberator 914.

Figure 10:
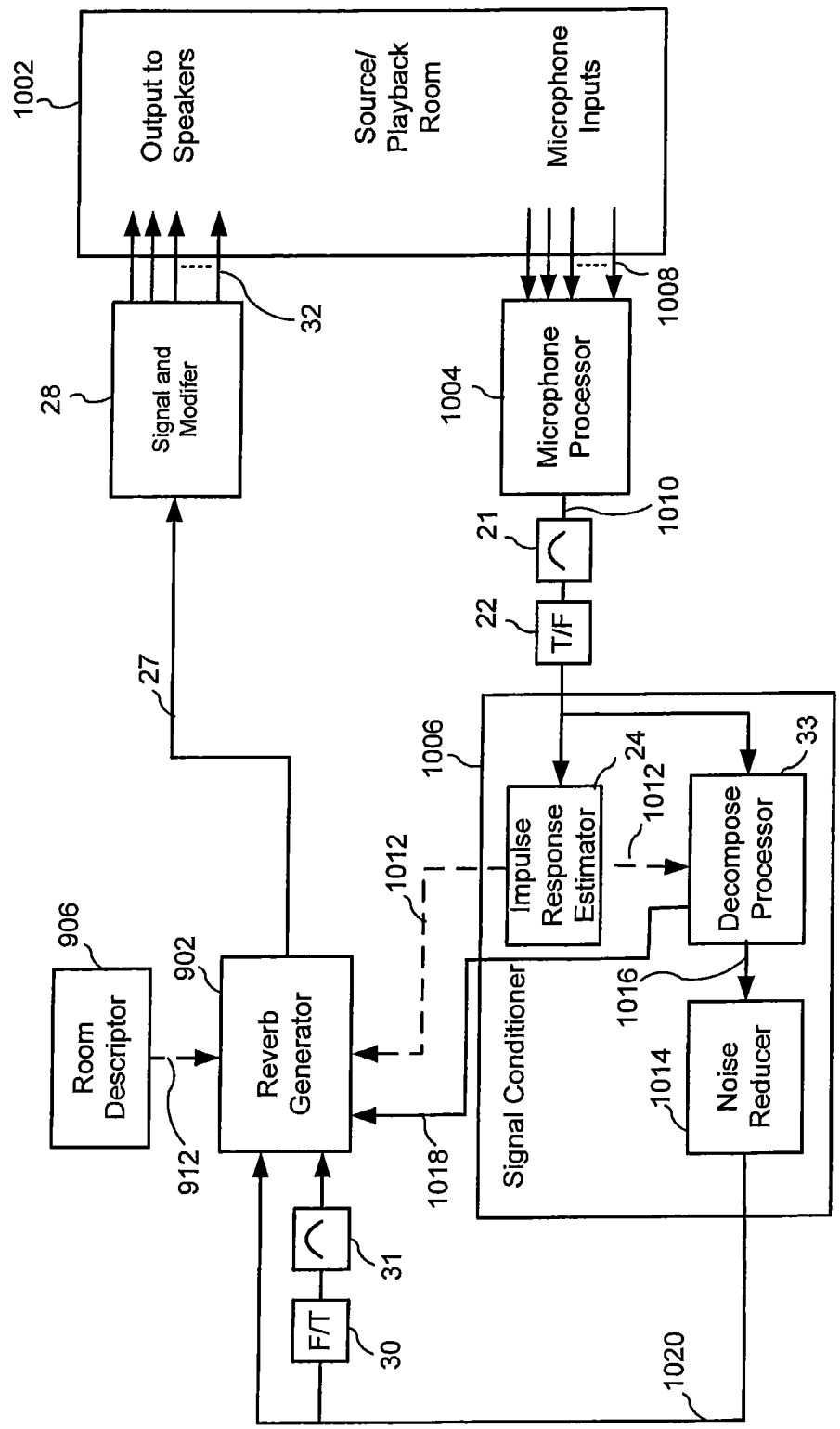
FIG. 10 depicts a schematic diagram of functionality of the example signal processor included in the audio signal processing system of FIG. 1.

FIG. 10 is another example of the audio signal processing system 10. In this example, illustration of audio input signal is omitted for purposes of the following discussion. In FIG. 10, the audio signal processing system 10 is configured to improve speech intelligibility in an acoustic space, and/or to modify or alter the perceived acoustics of an acoustic space. For purposes of brevity, the following discussion will focus mainly on those parts of the audio signal processing system 10 that are different from the previously described systems. Moreover, some of the previously discussed modules and components are shown in less detail, or are omitted from FIG. 10, however the example audio signal processor 10 of FIG. 10 may still include all of the previously discussed functionality.

In FIG. 10, an acoustic space is identified as a source/playback room 1002. The source/playback room 1002 is both a source room and a playback room since an audio input signal originates in the source/playback room 1002 and is output as sound waves by loudspeakers into the source/playback room 1002 using the audio signal processing system 10. The Source/Playback Room 1002 may be any acoustical space, such as a room, an area, a vehicle interior, or any other space in which audio source material may be generated and played back through loudspeakers.

The audio signal processing system 10 may include modules stored as instructions in memory of the frequency-to-time domain processors 30, windowing function 31, the signal modifier 28, the Reverb Generator 902, and the Room Descriptor 906. In addition, the audio signal processing system 10 includes modules stored as instructions in memory of a Microphone Processor 1004 and a Signal Conditioner 1006.

During operation, sounds created within the Source/Playback Room 1002 may be captured as audio source material by one or more microphones 3 distributed within the Source/Playback Room 1002. The microphone signal(s) may be received as microphone input signal(s) 1008, or audio signal input(s), to the Microphone Processor 1004. The Microphone Processor 1004 may pre-process the microphone input signals to perform level adjustments, mixing, and equalization of the microphone input signals. Pre-processing of the microphone input signals may be performed with the Microphone Processor 1004 based on predetermined settings stored in memory, user adjustable settings, or automatically adjustable setting that are determined based on the received microphone inputs. The automatically adjustable settings may be automatically adjusted based on sensors identifying the number of people in an acoustic space and their locations, such as seat sensors in a vehicle, temperature sensors, or any other sensing device The automatically adjustable settings may include sound processing with the Microphone Processor 1004 to minimize feedback or howling in the audio signal processing system 10.

The pre-processed microphone signal inputs are output from the Microphone Processor 1004 as pre-processed microphone signal(s) 1010 and received as inputs to the Signal Conditioner 1006. In FIG. 10, the pre-processed microphone signal (s) 1010 are converted from the time domain to the frequency domain with the windowing function 21 and the time-to-frequency domain processor 22, as previously discussed. In other examples, the Signal Conditioner 1006 may operate in the time domain and no conversion is needed.

The Signal Conditioner 1006 may include modules that include the Decompose Processor 33 configured to decompose the microphone input signal into dry and reverberant signal components, the Impulse Response Estimator 24 configured to generate an estimated impulse response for the source/playback room 1002, and a Noise Reducer 1014. A block-based estimate of the frequency domain representation of the impulse response of the Source/playback Room 1002 may be derived by the Impulse Response Estimator 24, as previously discussed, from the microphone input signals. The block-based estimate of the frequency domain representation of the impulse response of the microphone input signals may be provided to the Decompose Processor 33 and the Reverb Generator 902 as a microphone signal estimated impulse response 1012.

The Decompose Processor 33 may receive and further process the pre-processed microphone signals 1010 to decompose the signal(s) into a dry signal component and a reverberant signal component as previously discussed. The dry signal component may also be modified by the Dry Signal Modifier 36 (FIG. 9), and the reverberant signal component may be modified by the Reverberant Signal Modifier 37 (FIG. 9) as previously discussed. The dry signal component may be provided to Noise Reducer 1014 as a dry microphone input signal component 1016, and a reverberant microphone input signal 1018 component may be provided to the Reverb Generator 902.

The Noise Reducer 1014 may be configured to reduce any noise that may be present in the dry microphone input signal component 1016. Reduction in noise may include reducing any background noise in the Source/playback Room 1002 that may be captured by the microphones. The Noise Reducer 1014 may be configured with a noise reduction process based on spectral subtraction methods, or any other noise reduction techniques or mechanisms. In the example of FIG. 10 the Noise Reducer 1014 is illustrated as following after the Decompose Processor 33. In other examples, the Noise Reducer 1014 may precede the Decompose Processor 33 and/or be associated with individual microphones in the Source/playback Room 1002.

The noise reduced modified (or not) dry signal component of the microphone input signal(s) may be provided to the Reverb Generator 902 as a noise reduced dry microphone input signal(s) component 1020. If the Reverb Generator 902 operates in the frequency domain, and the noise reduced dry signal is in the time domain, the Reverb Generator 902 may directly receive and process the noise reduced dry microphone input signal(s) component 1020. Alternatively, if the Reverb Generator 902 operates in the time domain, where the noise reduced dry microphone input signal(s) component 1020 is in the frequency domain, the signal may be converted to the time domain with, for example, the frequency-to-time domain processors 30 and windowing function 31, such as a Hanning window. The Reverb Generator 902 may combine the noise reduced dry microphone input signal(s) component 1020 with either the modified (or not) reverberant component in the first mode, or the artificial reverberant component in the second mode, as previously discussed, to produce as outputs one or more reverberation-adjusted frequency spectra 27. In addition, the Reverb Generator 902 may operate in one of the selector modes to determine whether to operate in the first mode or the second mode. However, if the Reverb Info module 904 (FIG. 9) does not include information related to the Source/playback Room 1002, selector modes that involve the Reverb Info would be unavailable. The reverberation-adjusted frequency spectra 27 may be routed through amplifier(s) to loudspeakers in the Source/playback Room 1002.

The Room Descriptor 906 may provide playback room and target room descriptor information to the Reverb Generator 902 as previously discussed. The Reverb Generator 902 may use the microphone signal estimated impulse response 1012 provided by the Impulse Response Estimator 24 to adaptively alter operation of the audio signal processing system 10 such that the modified acoustical characteristics of the Source/playback Room 1002 may substantially match the acoustical characteristics provided by the Room Descriptor 906. More specifically, the Room Descriptor 906 may provide the Reverb Generator 902 with information regarding the desired acoustical characteristics of the modified Source/playback Room 1002. The block-based estimate of the impulse response provided by the Impulse Response Estimator 24 reflects the actual acoustical characteristics of the modified Source/playback Room 1002. Therefore, the Reverb Generator 902 may adapt its parameters until the actual acoustical characteristics of the modified Source/playback Room 1002 substantially match the desired acoustical characteristics provided by the Room Descriptor 906.

Based on the level and characteristics of the microphone inputs, the audio signal processing system 10 may dynamically and almost continuously adjust the reverberation-adjusted frequency spectra 27 to adapt to changing conditions in the Source/playback Room 1002. Accordingly, noise levels, number of listeners, listener positions and other variables within the Source/playback Room 1002 may be reflected in the reverberation-adjusted frequency spectra 27. In addition, the reverberation-adjusted frequency spectra 27 may be adjusted to provide any of a number of desired perceptual effects for listeners in the Source/Playback room 1002.

In one example, the reverberation-adjusted frequency spectra 27 may provide modified acoustical characteristics of a passenger cabin in a vehicle to improve speech intelligibility. In this example, noise sources such as engine noise, road noise, air conditioner fan noise, open windows, music or any other noise source can compromise speech intelligibility. The audio signal processing system 10 may add/modify the reverberation component to add early reflections to speech signals captured with the microphone audio signal 1008 without significantly increasing a noise level within the passenger cabin. In addition, the audio signal processing system 10 may adaptively adjust the reverberation component based on changing levels and characteristics of background noise. Further, positions of the listeners within the passenger cabin may be obtained from sensors, such as seat occupancy sensors, to increase speech intelligibility in the obtained seat positions. For example, the reverberation-adjusted frequency spectra 27 may be adjusted and routed to loudspeakers that are advantageously positioned proximate the obtained speech positions. In addition, seat position in combination with the location of the talkers and the listeners may be considered. For example, speech by a talker in a rear seat in the passenger cabin may be more intelligible for a front seat passenger, whereas speech by a talker in a front seat may be less intelligible for a rear seat passenger. Also, vehicle parameters such as vehicle speed, vibration or any other vehicle related parameter(s) may be used as inputs to the audio signal processing system 10 to further improve speech intelligibility based on changing conditions in the passenger cabin.

In another example, a small room may be given the acoustical characteristics of a large room, or a large room may be given the acoustical characteristics of a small room. For example, musicians often practice in small rehearsal rooms or sound isolation booths. The audio signal processing system 10 may alter the acoustical characteristics of such small rooms to simulate or synthesize a much larger room similar to one the musicians will eventually perform in. In another example, a small concert hall or venue with poor acoustical characteristics may be enhanced with the audio signal processing system 10. In still another example, in the context of a meeting of only a few individuals in a large acoustic space, the acoustical characteristics of the large acoustic space may be modified with the audio signal processing system 10 to provide a perception of relatively small acoustic space.

The reverberation-adjusted frequency spectra 27 may be routed and amplified before being sent to loudspeakers distributed within the Source/playback Room 1002. The loudspeakers may include loudspeakers located above the listener as well as loudspeakers located below the listener's ears. Accordingly, the audio signal processing system 10 may provide a perception of height beyond the height of an acoustic space, and a perception of distance beyond the boundary of an acoustic space, as previously discussed.

Figure 11:
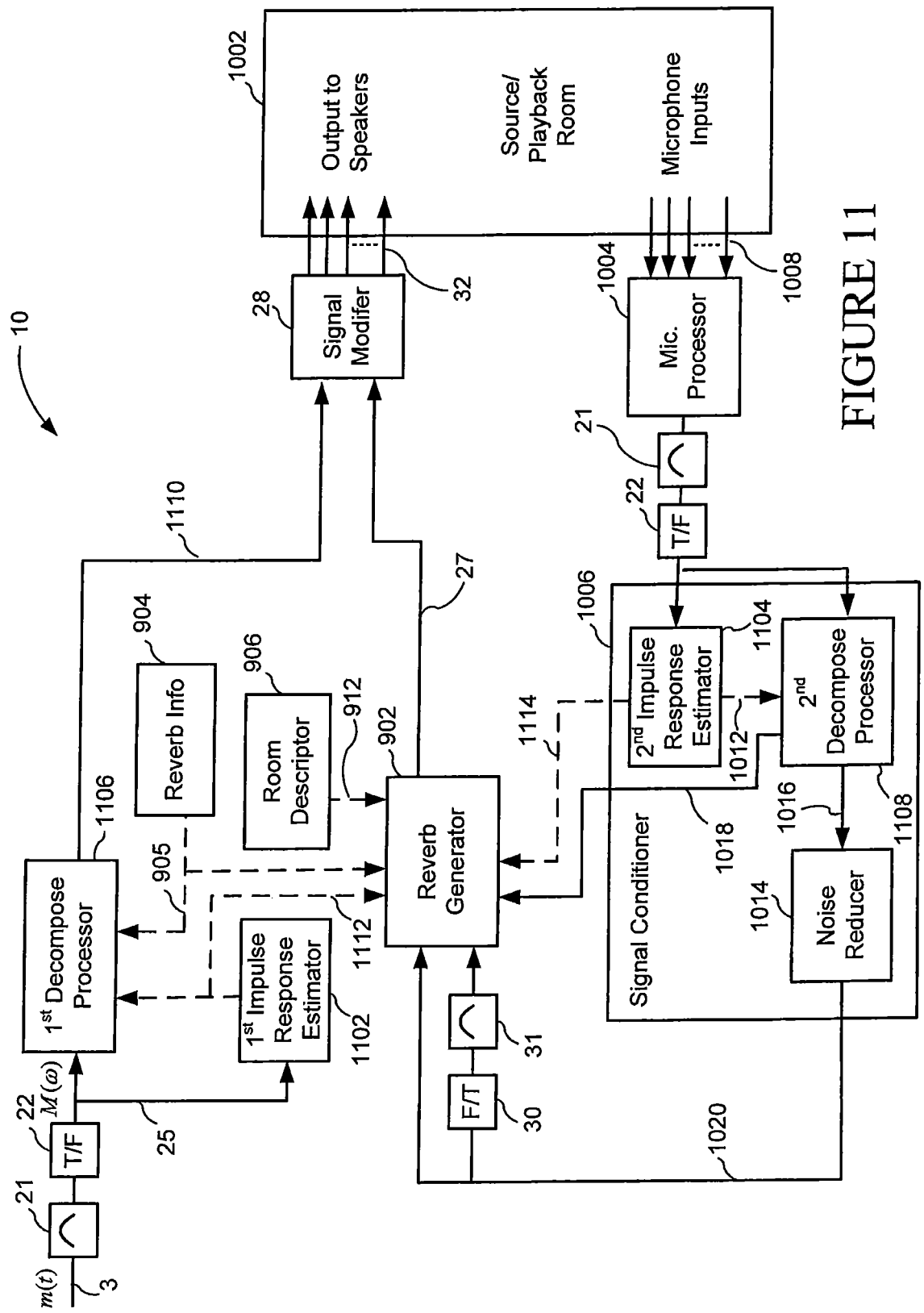
FIG. 11 depicts a schematic diagram of functionality of the example signal processor included in the audio signal processing system of FIG. 1.

FIG. 11 is another example of the audio signal processing system 10. In this example, the audio signal processing system 10 may receive an input audio signal m(t) 3 similar to the example of FIG. 9, and receive a microphone input signal similar to the example of FIG. 10. For purposes of brevity, the following discussion will focus mainly on those parts of the audio signal processing system 10 that are different from the previously described systems. Moreover, some of the previously discussed components are shown in less detail or are omitted from FIG. 11, however, the audio signal processing system 10 of FIG. 11 may still include all of the previously discussed functionality.

Similar to FIG. 10, the Source/playback Room 1002 may act as both the Source room and the Playback room. The Reverb Generator 902 may be set based on predetermined acoustic characteristics of a desired acoustic space to process either a modified (or not) reverberation component or an artificial reverberation component. In one example, parameters of the Reverb Generator 902 may be set based on the characteristics of reverberation found in the input audio signal $M(\omega)$ 25. In this example, the audio signal processing system 10 may enable the Source/playback Room 1002 to take on the acoustical characteristics of the reverberation found in the input signal $M(\omega)$ 25. As a result, sounds created within the Source/playback Room 1002 may take on the characteristics of the reverberation found in the input signal $M(\omega)$ 25. In a second example, the Source/playback Room 1002 may take on the acoustic characteristics provided with the Room Descriptor 906. In a third example, the Source/playback Room 1002 may take on the acoustic characteristics provided with the Reverb Info module 904.

Other modifications of the Source/playback Room 1002 may be performed with a processed audio signal such as the processed audio input signal or the processed microphone input signal. In one example, speech intelligibility may be improved with the processed microphone input signal. In another example, the Reverb Generator 902 may simultaneously provide audio input signal processing and microphone input signal processing to both modify the Source/playback Room 1004 and improve speech intelligibility of talkers and listeners present in the Source/playback Room 1004.

In FIG. 11, the audio signal processing system 10 includes the modules of the time-to-frequency domain processors 22 the frequency-to-time domain processors 30, the windowing functions 21 and 31, the signal modifier 28, the Reverb Generator 902, the Reverb Info module 904, the Room Descriptor 906, the Microphone Processor 1004, the Signal Conditioner 1006. In addition, the audio signal processing system 10 includes a first Impulse Response Estimator 1102, a second Impulse Response Estimator 1104, a first Decompose Processor 1106 and a second Decompose Processor 1108. The first Impulse Response Estimator 1102 and the first Decompose Processor 1106 are configured to operate with the input signal $M(\omega)$ 25, and the second Impulse Response Estimator 1104 and the second Decompose Processor 1108 are configured to operate with one or more microphone input signals.

The first Decompose Processor 1106 may decompose the input audio signal $M(\omega)$ into a first dry signal component 34 and a first reverberation signal component 35 similar to the Decompose Processor 33 of FIG. 9. The first dry component signal 34 may be provided to the Signal Modifier 28. In addition, the first reverberation signal component 35 may be provided to the Reverb Generator 902. As in previous example, the dry signal component 34 and the reverberant signal component 35 may be modified with the Dry Signal Modifier 36 (FIG. 9), and the Reverberant Signal Modifier 37 (FIG. 9), respectively.

The second Decompose Processor 1108 may decompose the pre-processed microphone signal(s) into a second dry component and a second reverberation component similar to the Decompose Processor 33 of FIG. 10 and provide the second dry signal component as a second dry signal component signal 1016 to the Noise Reducer 1014 and the second reverberant component to the Reverb Generator 902 as a second reverberation signal component signal 1018. The noise reduced modified (or not) second dry signal component may be provided to the Reverb Generator 902 as the noise reduced dry microphone input signal(s) component 1020.

The first Impulse Response Estimator 1102 may derive a first block-based estimate of a first impulse response $H(\omega)$ from the input signal $M(\omega)$. The first block-based estimate of the first impulse response is provided to the Reverb Generator 902 as a first impulse response estimate signal 1112. The second Impulse Response Estimator 1104 is configured to operate within the Signal Conditioner 1006 and provide a second block-based estimate of a second impulse response $\tilde{H}(\omega)$ derived from the microphone input signal(s). The second block-based estimate of the second impulse response is provided to the Reverb Generator 902 as a second impulse estimate signal 1114.

Operation of the audio signal processing system 10 to enable the Source/playback Room 1002 to take on the acoustical characteristics of a desired acoustic space, such as the reverberation found in the input signal $M(\omega)$ 25, may be accomplished in a number of different modify modes. Selection of one of the modify modes may be based on a manual user selection with the user interface 8 (FIG. 1) or an automatic selection by the audio signal processing system 10. Automatic selection may be based on, for example, the existence of an audio input signal m(t) 3, recognition via the microphone input signal(s) that speech is occurring in the Source/playback Room 1002, or automatically based on automated evaluation of the Source/playback Room 1002, existence of the microphone input signals 1008, the type of audio input signal m(t) 3 being detected as predominately speech or music, changes or fluctuations in impulse response of the microphone input signals 1008 indicative of instability, or any other detected or sensed parameters that would dictate operation in a particular modify mode.

In a first modify mode of operation, the Reverb Generator 902 may ignore the second block-based estimate of the second impulse response and operate similar to the Reverb Generator 902 described with reference to FIG. 9 to generate the reverberation-adjusted frequency spectra 27. In a second modify mode of operation, the Reverb Generator 902 may ignore the first block-based estimate of the impulse response and operate similar to the Reverb Generator 902 described with reference to FIG. 9 to generate the reverberation-adjusted frequency spectra 27.

In a third modify mode of operation, the Reverb Generator 902 may be configured to adapt its parameters to generate a third block-based impulse response from which a third reverberation component is determined and used to generate the reverberation-adjusted frequency spectra 27. Using the second block-based estimate derived from the microphone input signal(s) as a feedback indication, the Reverb Generator 902 may continue to adjust the third block-based impulse response, thereby adjusting the third reverberation component until the second block-based estimate from the second Impulse Response Estimator 1104 substantially matches a target indication, such as the first block-based estimate derived by the first Impulse Response Estimator 1102 from the input signal $M(\omega)$.

During operation in the third modify mode, the Reverb Generator 902 may at first generate the third block-based impulse response to substantially match the target, such as the first block-based estimate, and produce the reverberation-adjusted frequency spectra 27 based on the third reverberation component. As the audio signal processing system 10 operates, the third block based impulse may be adjusted away from the target as needed to substantially match the second block-based estimate to the target, and the third reverberation component may correspondingly change, resulting in changes to the reverberation-adjusted frequency spectra 27. As the reverberation-adjusted frequency spectra 27 changes, the second block-based estimate may correspondingly change. In this way the acoustical characteristics of the modified room may be dynamically and automatically optimally matched with the acoustical characteristics of the target, such as the input signal M(n), such that as the audio source material, the Source/playback Room 1002 or any other parameters change, the reverberation-adjusted frequency spectra 27 is adjusted to maintain optimal matching of the target based on the feedback indication.

In other examples of the third modify mode of operation, instead of the reverberation found in the input signal $M(\omega)$ 25 as the target, the second block-based estimate may be substantially matched to information from another target such as a target from the Room Descriptor 906 or the Reverb Info module 904. In still other examples with the third modify mode of operation, parameters such as the reverb time v. frequency or the early-to-late energy ratio v. frequency may be compared and matched to a target using a feedback indication.

In a fourth example of the third modify mode of operation, a user of the audio signal processing system 10 may be provided with a control mechanism in the user interface 8 (FIG. 1), such as a control knob to adjust the third block based impulse. In this example the user may be provided with some form of user interface, such as a graphical display indicating the similarity of a target, such as the first block-based estimate and a feedback indication, such as the second block-based estimate. As the user adjusts the third block-based impulse, changes in similarity of the target and feedback indication, such as the impulse responses, may be indicated. Accordingly, the user may manually adjust the third block-based impulse until the feedback indication substantially matches the target.

In addition to enabling the Source/playback Room 1002 to take on the acoustical characteristics of a desired target acoustic space by providing the reverberation-adjusted frequency spectra 27, in one example, the audio signal processing system 10 may also dynamically perform automatic equalization. The automatic equalization may modify the equalization curve (EQ) of the modified room response to substantially match a target EQ curve of a target acoustic space. Thus, the EQ curve may be part of the modified acoustical characteristics of the acoustic space and an EQ curve adjusted and reverberation-adjusted frequency spectra 27 may be provided. For example, the EQ curve of the dry signal component of the modified room response may be substantially matched to a target EQ curve of the dry signal component of the target room response. In addition, the EQ curve of the reverberation signal component that is combined with the dry signal component may be adapted to substantially match a target EQ curve of the reverberant portion of the target room response. The EQ curves of the dry signal component and the reverberant signal component of the target acoustic space could be provided with the Reverb Info module 904, or the Room Descriptor 906 as previously discussed.

For simplicity of presentation, FIG. 10 and FIG. 11 depict the case where the Microphone Processor 1004 provides a monophonic signal at its output. The figures also depict the case where the Reverb Generator 906 provides a monophonic signal at its output. In other examples, the Microphone Processor 1004 can provide a plurality of signals at its output. In addition, the number of microphone output signals does not have to be equal to the number of microphones. Instead, the number of microphone output signals can be less than or greater than the number of microphones. Further, the Reverb Generator 902 can provide a plurality of signals at its output, and the number of output signals does not have to be equal to the number of signals at the input to the Reverb Generator 902. Instead, the number of output signals of the Reverb Generator 902 can be less than or greater than the number of input signals.

Figure 12:
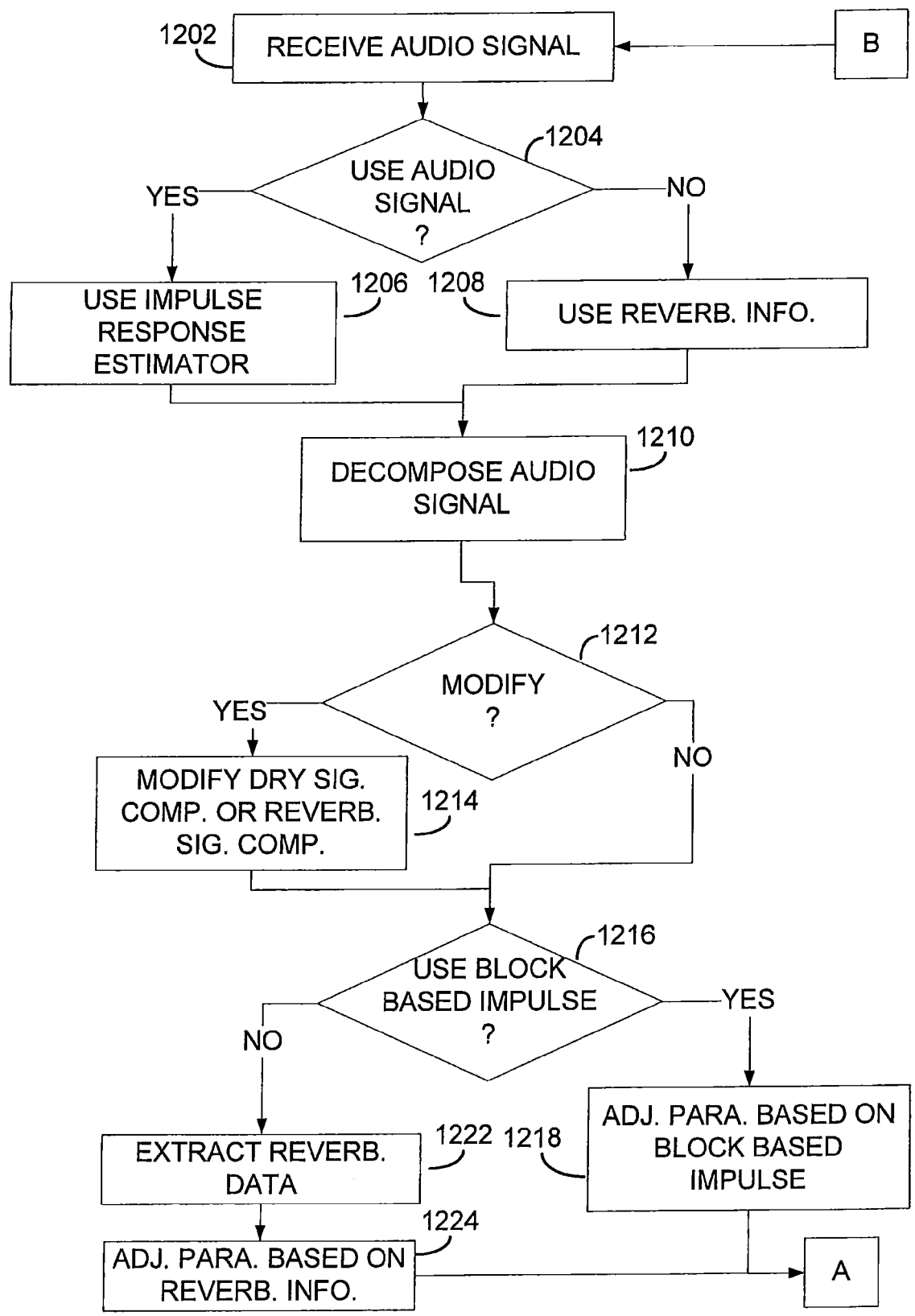
FIG. 12 is a process flow diagram illustrating operation of the audio signal processing system of FIGS. 1-11.

FIG. 12 is a process flow diagram illustrating example operation of the audio processing system with reference to FIGS. 1-11. At block 1202, an audio signal is received. The audio signal may be an input audio signal received from a source room. As previously discussed, the audio signal may be an input audio signal m(t) 3 or a microphone input signal 1008. At block 1204, it is determined whether the received audio signal will be used to generate a block-based estimated impulse response. If yes, at block 1206, the Impulse Response Estimator 24 generates a block-based estimated impulse response. If the audio signal is not used, at block 1208, the Reverb Info module 904 may retrieve reverb data. At block 1210, the audio signal may be decomposed with a decompose processor module 33 or 1106 or 1108 into a dry audio signal component 34 and a reverberant audio signal component 35 based on either the reverb data or the block based estimate generated with the Impulse Response Estimator 24.

It is determined if the dry audio signal component 34 or the reverberant signal audio component 35 should be modified at block 1212. If yes, at block 1214, the dry audio signal component 34 and/or the reverberant audio signal component 35 are modified. As previously discussed, modification of the dry audio signal component 34 and/or the reverberant audio signal component 35 may occur independently, and may include equalization, level adjustments, frequency filtering, and dynamic range processing. The operation then proceeds to block 1216 to determine if a block-based estimated impulse response from the Impulse Response Estimator 24 is to be used to adjust parameters of the Reverb Generator 902 so the reverberation created with the Reverb Generator 902 matches a desired reverberation, such as the input audio signal. If there is no modification at block 1212, the operation similarly proceeds to block 1216.

If it is determined at block 1216 that the block-based estimated impulse response from the Impulse Response Estimator 24 should be used, at block 1218 parameters of the Reverb Generator 902 are adjusted, as previously discussed. At block 1220 it is determined if the Room Descriptor module 906 should be used to adjust the parameters of the Reverb Generator 902.

If at block 1216 it is determined that the block-based estimated impulse response from the Impulse Response Estimator 24 should not be used, the Reverb Info module 904 may retrieve the reverb information at block 1222. At block 1224, the parameters of the Reverb Generator 902 are adjusted based on the retrieved reverb information and the operation continues to block 1220 in FIG. 13.

Figure 13:
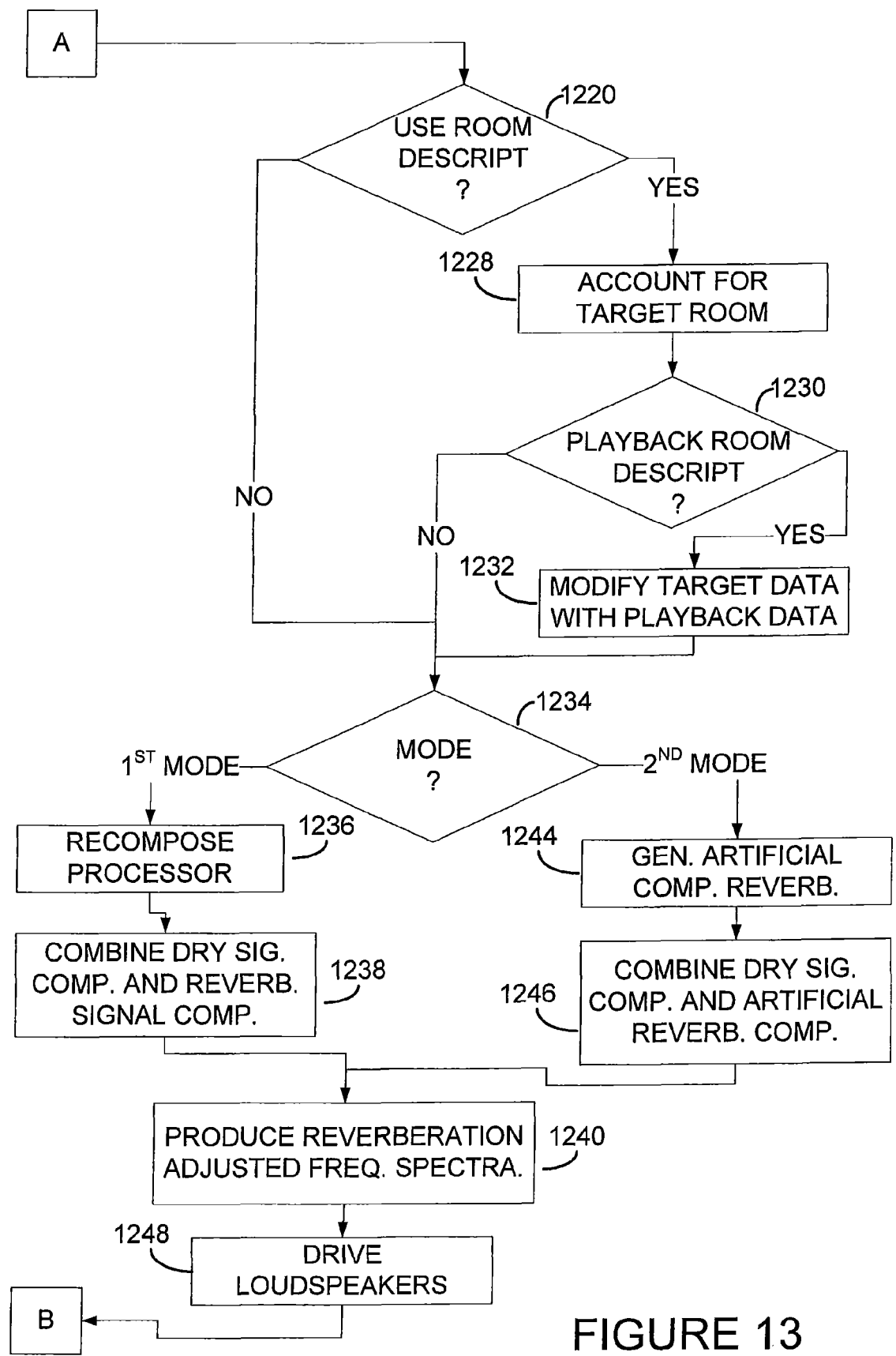
FIG. 13 is a second part of the process flow diagram FIG. 12.

In FIG. 13, if it is determined at block 1220 that the Room Descriptor module 906 should be used, at block 1228, the Reverb Generator 902 may account for the room descriptor information in processing the reverberation signal component 35 at block 1228. At block 1230, it is determined if target data included in the Target Room Descriptor module 908 should be modified with playback data from the Playback Room descriptor module 910. If yes, at block 1232, the target data is modified with the playback data. At block 1234 it is determined which mode the Reverb Generator will operate in. If at block 1220, it is determined not to use the Room Descriptor module 906, the operation proceeds to block 1234. Similarly, if the Playback Room descriptor is not available or not used at block 1230, the operation proceeds to block 1234.

At block 1234, if the Reverb Generator 902 is operated in the first mode, the recompose processor 38 is used at block 1236. At block 1238, the recompose processor 38 combines the modified (or not) dry signal component 34 with the modified (or not) reverberation signal component 35. The reverberation-adjusted frequency spectra that includes the combination of the modified (or not) dry signal component 34 and the modified (or not) reverberation signal component 35 is produced at block 1240.

If at block 1234 the Reverb Generator 902 is operated in the second mode, the artificial reverberator 914 generates the artificial reverberation component at block 1244. At block 1246 the artificial reverberator 914 combines the modified (or not) dry signal component 34 with the artificial reverberation component. At block 1240, the reverberation-adjusted frequency spectra that includes the combination of the modified (or not) dry signal component 34 and the artificial reverberation component is produced. At block 1242, the reverberation-adjusted frequency spectra may be processed, amplified and routed to loudspeakers to drive loudspeakers in an acoustic space.

The reverberation-adjusted frequency spectra may modify the acoustic characteristics of the acoustic space as previously discussed. Audio sound output by the loudspeakers in the acoustic space may be received by microphones in the acoustic space and provided as microphone input signals into a microphone processor module 1004. The operations illustrated in FIGS. 12 and 13 with the exception of blocks 1220, 1228, 1230 and 1232 may then be repeated to decompose the microphone input signals into a dry signal component and a reverberation signal component.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. An audio signal processing system for modifying an acoustic space with audio source content, the audio signal processing system comprising:
 a processor;
 a memory in communication with the processor; the memory configured to store a plurality of modules executable by the processor, the modules comprising:
 a reverberation generator module configured to adjust an early reflection of an audio signal to modify a user perceived height of a ceiling of a listening space;
 a signal modification module configured to create a multi-channel output signal based on the adjusted audio signal, the multi-channel output signal comprising a first channel output signal configured to drive a first loudspeaker positioned in a listening space above a listener, and a second channel output signal configured to drive a second loudspeaker positioned in the listening space below an elevation of a listener's ears.

2. The audio signal processing system of claim 1, where the early reflection is a plurality of early reflections, and the reverberation generation module is configured to separately adjust levels of the plurality of early reflections of the first channel output to modify the user perceived height of the ceiling of the listening space.

3. The audio signal processing system of claim 2, where the reverberation generation module is configured to separately adjust delays of the plurality of early reflections of the first channel output to modify the user perceived height of the ceiling of the listening space.

4. The audio signal processing system of claim 1, where the reverberation generation module is configured to separately adjust levels and delays of the plurality of early reflections of the second channel output to modify a user perceived height of a sound source above a floor of the listening space.

5. The audio signal processing system of claim 1, where the first channel output signal includes a dry signal component and a reverberation signal component, and the delay and level of the early reflection of the reverberation component are adjusted.

6. The audio signal processing system of claim 1, where the audio signal includes a dry signal component and a reverberation signal component, and the delay of the early reflection is adjusted in an estimate of the reverberation component, which is then combined with an estimate of the dry signal component.

7. The audio signal processing system of claim 6, where the adjusted estimate of the reverberation component is provided on at least one of the first channel output signal or the second channel output signal.

8. A method of modifying an acoustic space with audio source content, comprising:
   processing an audio input signal, the audio input signal including a dry component and a reverberant component;
   adjusting a level and a delay of an early reflection of only the reverberant component of the audio input signal to modify a listener perceived height of a ceiling of a listening space; and
   outputting an adjusted audio output signal to drive a loudspeaker positioned above a listening position in the listening space, the adjusted audio output signal including at least a portion of the adjusted reverberant component and the dry component.

9. The method of claim 8, where the loudspeaker is a first loudspeaker, and the method further comprises outputting the adjusted audio input signal to also drive a second loudspeaker positioned below an elevation of a listener's ear in the listening space.

10. The method of claim 8, further comprising decomposing the audio signal into the dry component and the reverberant component using a calculated estimate of an impulse response of a space in which the audio signal was captured.

11. The method of claim 8, where adjusting a level and a delay of an early reflection of only the reverberant component of the audio signal further comprises altering a listener perceived distance of the loudspeaker from the listener.

12. The method of claim 8, where outputting an adjusted audio output signal to drive a loudspeaker positioned above a listening position in the listening space comprises simulating an early reflection of a sound wave due to the ceiling of the listening space using the adjusted audio output signal.

13. The method of claim 8, further comprising receiving a microphone input signal and further adjusting at least one of the level or the delay of the early reflection of only the reverberant component of the audio signal based on the microphone input signal to further modify the listener perceived height of the ceiling of the listening space to substantially match a target listening space that is different than the listening space.

14. The method of claim 8, where the loudspeaker is position proximate an interior roof of a vehicle, and adjusting the level and the delay of an early reflection of only the reverberant component of the audio input signal comprises perceptually adjusting a height of the interior roof of the vehicle by driving the loudspeaker.

15. A non-transitory computer readable storage medium that stores instructions executable by a processor to modify an acoustic space with audio source content, the non-transitory computer readable storage medium comprising:
   instructions executable by the processor to process an audio signal having a dry component and a reverberant component;
   instructions executable by the processor to calculate an estimate of the dry component and an estimate of the reverberant component from the audio signal;
   instructions executable by the processor to separately adjust early reflections of the estimated reverberant component to adjust a listener perceived height of a listening space, the early reflections separately adjusted based on a target listening space;
   instructions executable by the processor to generate output frequency spectra based on the adjusted reverberant component and the dry component; and
   instructions executable by the processor to generate an audio output channel from the frequency spectra, the audio output channel configured to drive a loudspeaker positioned above the listening space.

16. The non-transitory computer readable storage medium of claim 15, further comprising instructions executable by the processor to separately adjust the early reflections by separate adjustment of delays applied to the early reflections.

17. The non-transitory computer readable storage medium of claim 15, further comprising instructions executable by the processor to separately adjust the early reflections by separate adjustment of levels of the early reflections.

18. The non-transitory computer readable storage medium of claim 15, further comprising instructions executable by the processor to separately adjust the early reflections by separate filtering of the early reflections to alter a frequency response of a combination of the dry signal component and the filtered reverberant signal component.

19. The non-transitory computer readable storage medium of claim 15, where the audio output channel is a first audio output channel and the loudspeaker is a first loudspeaker, the computer readable storage medium further comprising:
   instructions executable by the processor to adjust early reflections of the estimated reverberant component to adjust a listener perceived distance to a floor of the listening space; and
   instructions executable by the processor to generate a second audio output channel from the frequency spectra, the second audio output channel configured to drive a second loudspeaker positioned in the listening space at an elevation below a listener's ears.

20. The non-transitory computer readable storage medium of claim 19, further comprising instructions executable by the processor to adjust the early reflections of the estimated reverberant component separately based on the target listening space.

21. The non-transitory computer readable storage medium of claim 20, further comprising instructions executable by the processor to separately adjust the early reflections of the estimated reverberant component by separate adjustment of at least one of levels or delays of the early reflections of the estimated reverberant component.

22. The non-transitory computer readable storage medium of claim 19, further comprising instructions executable by the processor to add a diffuse exponentially decaying system to the first audio signal and the second audio signal to reduce user perceived boundaries of the listening space.

* * * * *